United States Patent [19]
Taki

[11] Patent Number: 6,111,909
[45] Date of Patent: Aug. 29, 2000

[54] WIRELESS COMMUNICATION SYSTEM

[75] Inventor: Kazunari Taki, Nagoya, Japan

[73] Assignee: Brother Kogyo Kabushiki Kaisha, Nagoya, Japan

[21] Appl. No.: 09/012,824

[22] Filed: Jan. 23, 1998

[30] Foreign Application Priority Data

Jan. 23, 1997 [JP] Japan .................................... 9-010006

[51] Int. Cl.[7] .............................. A61F 2/06; H04L 27/30
[52] U.S. Cl. ......................... 375/132; 375/133; 370/312; 455/509
[58] Field of Search ..................................... 375/200, 202, 375/259, 219, 222, 130, 132, 133, 135, 136; 370/310, 312; 455/73, 561, 509, 524

[56] References Cited

U.S. PATENT DOCUMENTS

| | | | |
|---|---|---|---|
| 5,142,534 | 8/1992 | Simpson et al. | 370/338 |
| 5,459,760 | 10/1995 | Watanabe | 375/202 |
| 5,748,669 | 5/1998 | Yada | 375/202 |
| 5,862,171 | 1/1999 | Mahany | 375/200 |
| 5,982,762 | 11/1999 | Anzai et al. | 370/338 |

*Primary Examiner*—Chi H. Pham
*Assistant Examiner*—Bryan Webster
*Attorney, Agent, or Firm*—Oliff & Berridge, PLC

[57] ABSTRACT

A wireless communication system including a base unit and a plurality of remote units, in which two remote units can communicate separately from and simultaneously with communication between the base unit and another remote unit. The wireless communication system can maintain synchronization between the base unit and remote units and process such control signals as call signals without interrupting communication currently in progress. To achieve this, a communication hop frequency data array D is provided for communication use. A control hop frequency data array G is also provided for control use. Both data arrays D and G are stored in a hopping table 36. Data elements In the control hop frequency data array G and in the communication hop frequency data array D are retrieved from the hopping table 36 so that data in the data array G will be distributed regularly throughout the communication hop frequency data array D.

28 Claims, 14 Drawing Sheets

FIG. 4 (a)

| N | D |
|---|---|
| 0 | d0 |
| 1 | d1 |
| 2 | d2 |
| 3 | d3 |
| 4 | d4 |
| ... | ... |
| N | dN |
| N+1 | dN+1 |
| N+2 | dN+2 |
| ... | ... |
| Nmax | dNmax |

| M | G |
|---|---|
| 0 | g0 |
| 1 | g1 |
| 2 | g2 |
| 3 | g3 |
| 4 | g4 |
| ... | ... |
| M | gM |
| ... | ... |
| Mmax | gMmax |

| C | M | N | FD |
|---|---|---|---|
| 0 | 0 |   | g0 |
| 1 |   | 1 | d1 |
| 2 |   | 2 | d2 |
| 3 |   | 3 | d3 |
| ... |   | ... | ... |
| 10 |   | 10 | d10 |
| 11 | 1 |   | g1 |
| 12 |   | 11 | d11 |
| 13 |   | 12 | d12 |
| ... |   | ... | ... |
| 11i | i |   | gi |
| 11i+1 |   | 10i+1 | d10i+1 |
| 11i+2 |   | 10i+2 | d10i+2 |
| ... |   | ... | ... |

FIG. 4 (d) ↙ H1 (S = 2)

| C | M | N | FD |
|---|---|---|---|
| 0 | 0 |   | g0 |
| 1 |   | 3 | d3 |
| 2 |   | 4 | d4 |
| 3 |   | 5 | d5 |
| ... |   | ... | ... |
| 10 |   | 12 | d12 |
| 11 | 1 |   | g1 |
| 12 |   | 13 | d13 |
| 13 |   | 14 | d14 |
| ... |   | ... | ... |
| 11i | i |   | gi |
| 11i+1 |   | 10i+3 | d10i+3 |
| 11i+2 |   | 10i+4 | d10i+4 |
| ... |   | ... | ... |

FIG. 15 (a)

| FRAME | A0 | A1 | ... | A6 | ... | A12 | ... | A18 | ... |
|---|---|---|---|---|---|---|---|---|---|
| M | 0 | 1 | ... | 1 | ... | 2 | ... | 3 | ... |
| N | 0 | 1 | ... | 5 | ... | 10 | ... | 15 | ... |
| 10 | □ | | | | | | | | ←fB |
| 11 | | | | □ | | | | | ←fB |
| 12 | | | | | | □ | | | ←fB |
| 13 | | | | | | | | □ | ←fB |

FIG. 15 (b)

| FRAME | B0 | B1 | B2 | ... | B6 | B7 | B8 | ... | B12 | ... | B18 |
|---|---|---|---|---|---|---|---|---|---|---|---|
| M | 0 | 1 | 1 | ... | 1 | 2 | 2 | ... | 2 | ... | 3 |
| N | 0 | 1 | 2 | ... | 5 | 6 | 7 | ... | 10 | ... | 15 |
| 10 | □ | ■ | ■ | ... | | ■ | ■ | ... | | ... | ←fB |
| 11 | | | | | □ | | | | | | ←fB |
| 12 | | ■ | ■ | ... | | ■ | ■ | ... | □ | ... | ←fB |
| 13 | | | | | | | | | | | ←fB |

FIG. 15 (c)

| FRAME | C0 | C1 | C2 | ... | C6 | C7 | C8 | ... | C12 | ... | C18 |
|---|---|---|---|---|---|---|---|---|---|---|---|
| M | 0 | 1 | 1 | ... | 1 | 2 | 2 | ... | 2 | ... | 3 |
| N | 0 | 1 | 2 | ... | 5 | 6 | 7 | ... | 10 | ... | 15 |
| 10 | □ | ■ | ■ | ... | | ■ | ■ | ... | | ... | ←fB |
| 11 | | | | fH1→ | □ | ■ | ■ | ... | | ... | |
| 12 | | ■ | | ... | | ■ | ■ | ... | □ | ... | ←fB |
| 13 | | | | fH1→ | □ | ■ | ■ | ... | | ... | □ |

FIG. 15 (d)

| FRAME | D0 | D1 | D2 | ... | D6 | ... | D12 | D13 | D14 | ... | D18 |
|---|---|---|---|---|---|---|---|---|---|---|---|
| M | 0 | 1 | 1 | ... | 1 | ... | 2 | 2 | 2 | ... | 3 |
| N | 0 | 1 | 2 | ... | 5 | ... | 10 | 11 | 12 | ... | 15 |
| 10 | □ | | | ... | | ... | | ■ | ■ | ... | ←fB |
| 11 | | | | | □ | ... | | | | | ←fB |
| 12 | | | | ... | | ... | □ | ■ | ■ | ... | ←fB |
| 13 | | | | | | | | | | | ←fB |

WIRELESS COMMUNICATION SYSTEM

BACKGROUND OF THE INVENTION

1. Field of the Invention

The present invention relates to a wireless communication system including a base unit and two or more remote units (handsets), in which system direct communication can be performed between two handsets.

2. Description of the Related Art

In bi-directional communications performed by conventional cordless telephones, a base unit transmits data to a remote unit at a frequency f1; and the remote unit transmits data to the base unit using another frequency f2. However, when using a system with this arrangement and having two or more remote units with one base unit, it has not been possible to perform communications directly between two remote units (hereinafter referred to as remote-to-remote communication). Direct communication has only been possible between the base unit and a remote unit (hereinafter also referred to as base-to-remote communication). That is, data transmitted by a first remote unit at a frequency f2 can only be received by the base unit, which is designed to receive frequency f2, and cannot be received by a second remote unit, which is designed to receive a frequency f1.

Cordless telephones that perform frequency hopping spread spectrum communications between a base unit and remote units are well known in the art. During communication operations, this type of cordless telephone employs a prearranged frequency switching order called a hopping pattern. Both the base unit and remote units communicate using the same hopping pattern.

SUMMARY OF THE INVENTION

However, direct remote-to-remote communication has thus far not been possible when using a plurality of remote units, because signals sent between the remote units during such direct communication could potentially conflict with control signals sent from the base unit.

In view of the problems described above, it is an object of the present invention to provide a wireless communication system capable of performing direct remote-to-remote communication separate from base-to-remote communication. It is another object of the present invention to provide a wireless communication system capable of simultaneously performing base-to-remote communication and remote-to-remote communication, during which time all communication units employ the same hopping pattern.

In order to attain the above and other objects, the invention provides a wireless communication system, comprising: a base communication unit capable of being connected to an external communication circuit and of being wirelessly communicated with a plurality of remote communication units, the base communication unit including: input means for inputting input signals to be transmitted to at least one of the remote communication units; reception means for receiving reception signals transmitted from at least one of the remote communication units; hop frequency data generating means for generating an array of hop frequency data according to a predetermined sequence, the hop frequency data array being formed from a communication hop frequency data array and a communication hop frequency data array in a manner that data constituting the control hop frequency data array is distributed throughout the communication hop frequency data array; and communication means for creating transmission signals through spreading the input signals with the hop frequency data and for creating output signals through despreading the reception signals with the hop frequency data; and the plurality of remote communication units, each remote communication unit being capable of communicating wirelessly with the base communication unit and with other remote communication units, each remote communication unit including: input means for inputting input signals t6 be transmitted to one of the base unit and the other remote communication units; reception means for receiving reception signals transmitted from one of the base unit and the other remote communication units; hop frequency data generating means for generating an array of hop frequency data according to a predetermined sequence, the hop frequency data array being formed from a communication hop frequency data array and a communication hop frequency data array in a manner that data constituting the control hop frequency data array is distributed throughout the communication hop frequency data array; and communication means for creating transmission signals through spreading the input signals with the hop frequency data and for creating output signals through despreading the reception signals with the hop frequency data.

According to another aspect, the present invention provides a wireless communication system using a frequency hopping method, the system comprising; a base communication unit capable of being connected to an external communication circuit; and a plurality of remote communication units, each being capable of communicating wirelessly with the base communication unit and with other remote communication units, each of the base communication unit and the plurality of remote communication units including: hop frequency data generating means for generating hop frequency data according to a prescribed sequence, the generated hop frequency data sequence including a control hop frequency data array and a communication hop frequency data array, data from the control hop frequency data array being distributed throughout the communication hop frequency data array; and communication means for creating transmission signals through spreading input signals with using the hop frequency data and for creating output signals through despreading reception signals with using the hop frequency data provided by the hop frequency data generating means.

BRIEF DESCRIPTION OF THE DRAWINGS

In the drawings:

FIGS. 4(a) and 4(b) show a communication hop frequency data array D and a control hop frequency data array G stored in a hopping table;

FIG. 4(c) shows how the data elements in the communication hop frequency data array D and the control hop frequency data array G are retrieved from the hopping table in base-to-remote communication;

FIG. 4(d) shows how the data elements in the communication hop frequency data array D and the control hop frequency data array G are retrieved from the hopping table in one example of a remote-to-remote communication;

FIG. 15(a) is a chart showing the states of communication operations in the base unit and remote units over time during a wait state;

FIG. 15(b) is a chart showing the states of communication operations in the base unit and remote units over time when a base unit 10 calls a remote unit 12;

FIG. 15(c) is a chart showing the states of communication operations in the base unit and remote units over time when a remote unit 13 calls a remote unit 11 while the base unit 10 continues communicating with the remote unit 12; and FIG. 15(d) is a chart showing the states of communication operations In the base unit and remote units over time when the remote unit 12 calls the base unit 10.

DETAILED DESCRIPTION OF THE PREFERRED EMBODIMENT

A wireless communication system according to a preferred embodiment of the present invention will be described while referring to the accompanying drawings.

Figure 1:
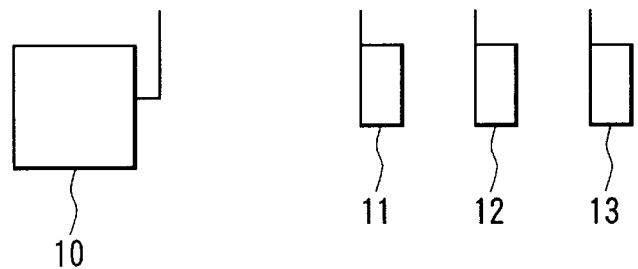
FIG. 1 is a block diagram showing the overall structure of a wireless communication system according to a preferred embodiment of the present invention.

As shown in FIG. 1, the wireless communication system of the present embodiment includes one base unit 10 connected to an external communication circuit such as a telephone circuit (not shown), and three remote units 11–13 capable of communicating wirelessly with the base unit 10.

Figure 2:
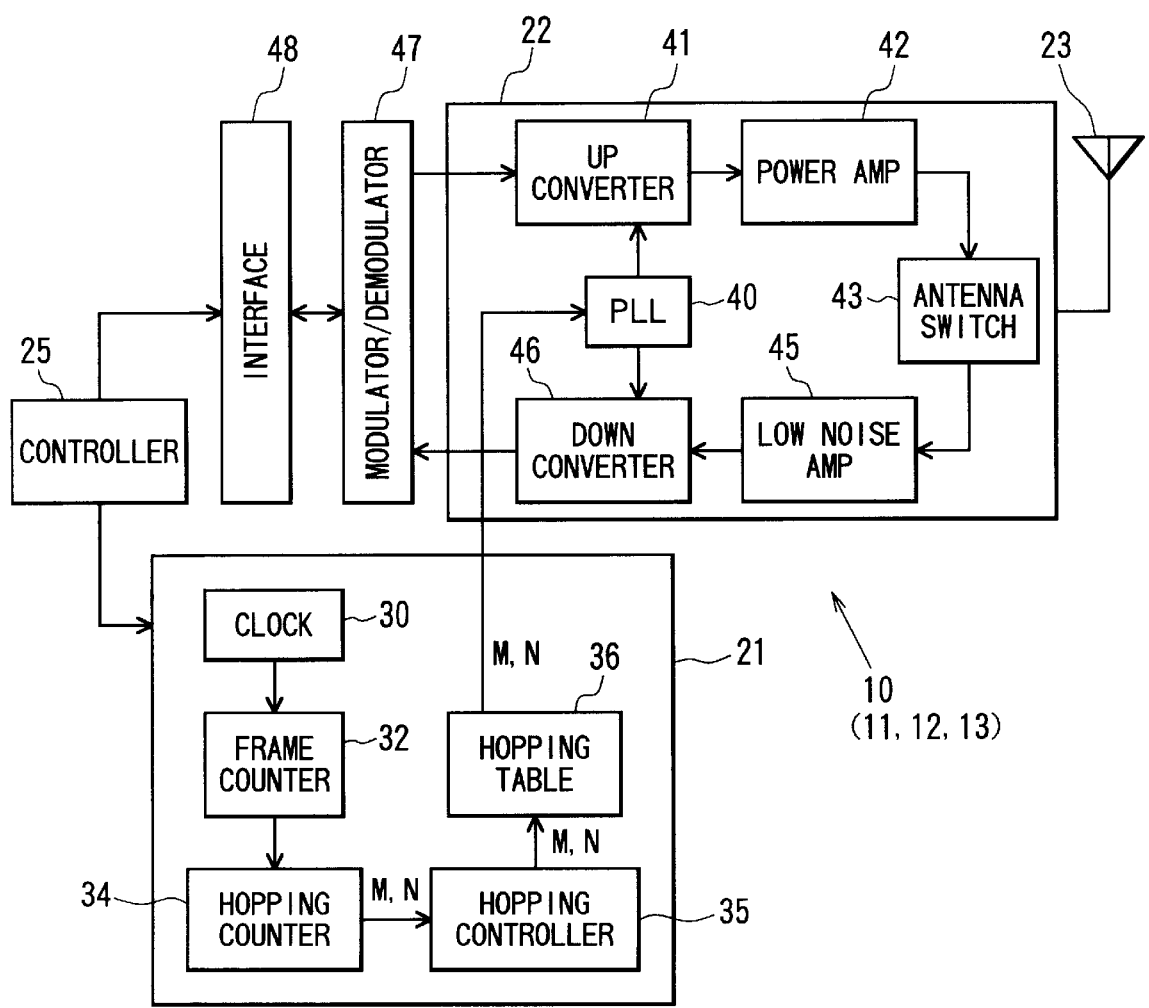
FIG. 2 is a block diagram showing the main circuit configuration of each of the base unit and the remote units in the system of FIG. 1.

The base unit 10 and the remote units 11–13 have a common circuitry configuration shown in FIG. 2. This circuitry configuration includes a hop frequency data generator 21 for generating hop frequency data used to switch frequencies according to a prescribed hopping pattern; a communication unit 22 for creating transmission signals, using the hop frequency data provided from the hop frequency data generator 21, to spread input signals, and for creating output signals by despreading reception signals; an antenna 23 through which signals are transmitted and received; an interface unit 48 including a codec and a compressor for converting between voice signals and digital signals, when treating signals from a telephone, and including a data converter for performing buffering and error correction processes, when treating digital signals such as signals from a personal computer; and a modulator/demodulator 47 for modulating signals received from the interface unit 48 and providing those signals to the communication unit 22 as input signals and for demodulating output signals received from the communication unit 22 and transmitting those signals to the interface unit 48.

A controller (CPU) 25 is also provided in connection with the hop frequency data generator 21 and the interface 48. The controller 25 is for controlling the entire unit (10, 11, 12, or 13). That is, the controller 25 performs various judgment operation. For example, the controller 25 in each unit determines that connection is being possible if a call signal is received from a remote unit when the subject unit is not performing any communication with other units. The controller 25 in each remote unit performs synchronization operation with using a synchronization signal transmitted from the base unit 10 and confirms that synchronization has been attained With the base unit, The controller 25 also produces various control signals to be used in communication with remote units as will be described later.

The hop frequency data generator 21 is provided with a clock 30 for outputting electrical pulses at a uniform frequency; a frame counter 32 for counting the number of output signals received from the clock 30 and outputting start hopping signals; a hopping counter 34 for counting the number of start hopping signals input from the frame counter 32 and outputting hop numbers; a hopping controller 35 for receiving the hop numbers output from the hopping counter 34, performing a specified modification operation, if necessary, on the values of the numbers received, and outputting the resultant modified or non-modified numbers; and a hopping table 36 for storing prescribed hop frequency data arrays.

The hopping table 36 can be constructed from a ROM, a RAM, or other various types of data storage media. The hopping controller 35 successively outputs a number whose value successively changes. Based on this number, hop frequency data i is successively read out from the hopping table 36 and is supplied to the communication unit 22. The value of the hop frequency data i therefore successively changes according to the number outputted from the hopping controller 35.

The frame counter 32, the hopping counter 34, the hopping controller 35, and the hopping table 36 are configured as separate devices, as described above. However, the same functions can be achieved with logical operations performed by a single central processing unit, well-known in the art.

The communication unit 22 is provided with a PLL (phase locked loop) frequency synthesizer 40, an up converter 41, a power amplifier 42, an antenna switch 43, a low noise amplifier 45, and a down converter 46.

The frequency synthesizer 40 is for oscillating at a frequency fi' in response to hop frequency data i supplied from the hop frequency data generator 21. The frequency synthesizer 40 therefore outputs signals whose frequency fi' hops successively. The up converter 41 is for receiving: the frequency-hopping signals supplied from the frequency synthesizer 40; and input signals inputted from a transmitter (mouthpiece; not shown) or other various devices through the interface 48 and the modulator/demodulator 47. The frequency of the input signals has been modulated by the modulator/demodulator 48 into signals at a frequency fIF. The main component in the up converter 41 is a mixer for mixing together the input signals from the modulator/demodulator 47 and the frequency-hopping signals from the frequency synthesizer 40. The up converter 41 multiplies the input signals fIF with the frequency-hopping signals fi', thereby generating transmission signals. The resultant transmission signals have frequency fi (=fi'+fIF).

The power amplifier 42 is for receiving the frequency fi transmission signals and for amplifying the fi transmission signals. The antenna switch 43 is for receiving the amplified fi transmission signals and for controlling the antenna 23 to wirelessly transmit the fi transmission signals to remote devices.

The antenna switch 43 is also for controlling the antenna 23 to receive signals at a frequency fi. The low noise amplifier 45 is for receiving via the antenna switch 43 the received fi signals and for amplifying the received fi signals. The down converter 46 is for receiving: the amplified fi signals supplied from the low noise amplifier 45; and the frequency-hopping signals fi' supplied from the frequency synthesizer 40. The down converter 46 is for mixing the fi signals with the frequency-hopping fi' signals to generate output signals at a frequency fIF. The main component in the down converter 46 is a mixer for subtracting the frequency-hopping signals fi' from the received fi signals. More specifically, the down converter 46 multiplies the received fi signals with the frequency-hopping signals fi', thereby recovering an original fIF frequency output signal.

With the above-described structure, the communication unit 22 operates as described below during the transmission process.

The frequency synthesizer 40 oscillates at a frequency fi' in correspondence with hop frequency data i supplied from the hop frequency data generator 21, thereby generating frequency-hopping signals. The frequency fi' of the frequency-hopping signals hops according to the successively-changing hop frequency data i. The up converter 41 mixes the fIF input signals supplied from the modulator/demodulator 47 with the frequency-hopping fi' signals, to create transmission signals whose frequency fi also hops according to the hopping of the frequency of the frequency-hopping fi' signals. The power amplifier 42 amplifies the frequency fi transmission signals, which are then transmitted from the antenna 23 via the antenna switch 43. Thus, the input signals, inputted to the communication unit, are transmitted while their frequencies are changed or spread with using the frequency-hopping signals. In other words, the input signals are spread with the frequency-hopping signals and are transmitted to remote communication devices.

During the reception process, the communication unit 22 operates as described below. The antenna 23 receives signals at a frequency fi. The fi reception signals are input into the low noise amplifier 45 via the antenna switch 43 and are amplified thereby. The down converter 46 mixes the fi amplified signals with the frequency-hopping fi' signals, which are input from the frequency synthesizer 40, thereby generating output signals at the frequency fIF. The thus generated output signals are demodulated by the modulator/demodulator 47 and transferred via the interface 48 to a telephone receiver or the like. Thus, the reception signals, wirelessly transmitted to the subject communication unit, are converted into output signals while their frequencies are despread with using the frequency-hopping signals. In other words, the reception signals are despread with the frequency-hopping signals and are used as output signals.

The above-described transmission and reception operations are performed according to the two switched or toggled positions of the antenna switch 43.

It is noted that rather than performing the frequency conversions in one step as described above, the communication unit 22 can be configured as added with another local oscillator to perform the frequency conversions in two steps.

The above-described components are the main components related to the present embodiment. In addition to these components, each of the base unit 10 and the remote units 11–13 in the present embodiment is provided with such components as a telephone receiver and transmitter, dialing keys, various switches, and the like, which are commonly provided with base units and remote units. Since such components are well known in the art, description of them are omitted from the following description.

Next, the communication manner employed by the wireless communication system of the present embodiment will be described.

Figure 3:
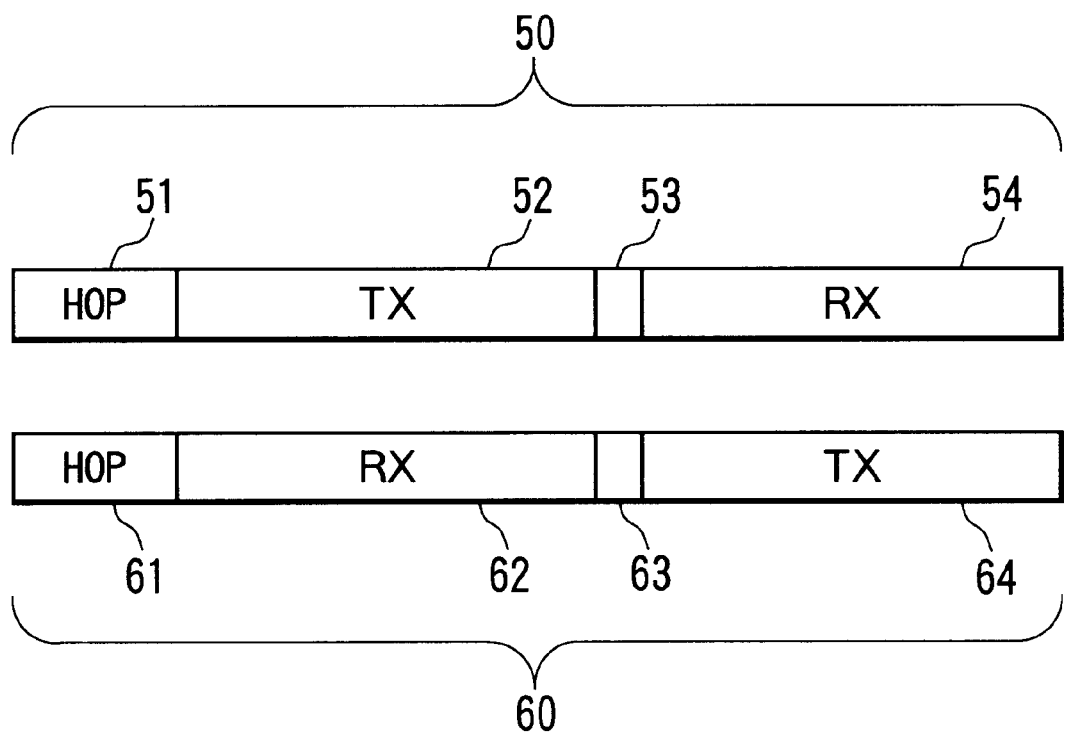
FIG. 3 is an explanatory diagram for a frame, which is a communication time unit used in bi-directional communications.

The wireless communication system of the present embodiment performs bi-directional communications using time-division duplexing. More specifically, when the base unit 10 communicates with one of the remote units 11–13, the base unit 10 operates In time units of frames 50 as shown in FIG. 3, while the remote unit operates in time units of frames 60 as also shown in FIG. 3. Each frame 50 includes a frequency hop phase 51, a transmission phase 52, a transmission/reception switch phase 53, and a reception phase 54. Each frame 60 includes a frequency hop phase 61, a reception phase 62, a transmission/reception switch phase 63, and a transmission phase 64. The start and end timings for each of the above phases within the frame are predetermined and are executed based on the output signals (counted number) outputted from the frame counter 32 described above.

The frequency hop phase 51 (or 61) allows the transmission/reception frequency fi to stabilize. This is necessary because the frequency is changed at the beginning of the frame and is therefore in a transition stage. Transmission and reception operations are not performed between the communication devices during this phase 51 (or 61).

The transmission phase 52 of the base unit 10 (and the reception phase 62 of the remote units 11–13) is a period in which the base unit 10 transmits signals to the remote units 11–13. The input signals to be transmitted to the remote units from the bass unit 10 include: communication signals (voice or other data signals) inputted from the telephone transmitter or other various devices; and control signals. The control signals include: synchronization signals for maintaining frame synchronization between the base unit 10 and the remote units 11–13; call signals for calling one of the remote units 11–13; connection acknowledge signals for informing a remote unit that call signals have been received from that remote unit; and busy signals to inform a remote unit that the base unit 10 is being currently engaged in communication with another communication device, such as another remote unit.

A synchronization signal is comprised of a bit array of a specific pattern set in a specific location of the overall transmission. The remote unit receiving the transmission detects this bit array in the transmission signals and resets its own frame counter 32 so that the position of the bit array is set to the above-mentioned specific location. For example, if the counted value of the frame counter 32 becomes "m" when the base unit 10 completes transmission of the synchronization bit array, the receiving remote unit (controller 25) resets its own frame counter 32 to the same value "m" when the entire bit array has been received.

By resetting its frame counter 32 to coincide with the frame counter 32 in the base unit 10, the remote unit is synchronized with the base unit 10. Hereafter, the base unit 10 and the remote unit will switch frames in synchronization with each other simply by managing their own frame counters 32 to increment according to pulse signals issued from their own clocks 30. If this synchronization adjustment is performed properly, the base unit 10, and the remote units 11–13 will switch frames with no great disparity in timing, even if slight differences occur in the intervals of pulses output from their respective clocks 30.

A call signal is the first signal that the base unit 10 transmits when desiring to begin communication with one of the remote units 11–13. The call signal includes an ID number specifying with which remote unit to link. On the other hand, when a call signal is received from one of the remote units 11–13, a connection acknowledge signal is transmitted from the base unit 10 to the calling remote unit in response to the call signal. The connection acknowledge signal is for informing that communication with the base unit 10 is possible. When this connection acknowledge signal is transmitted, communication between the base unit 10 and the remote unit that has sent the call signal begins in the next frame. A busy signal is for indicating that the base unit 10 is currently being engaged in communication with one remote unit, and includes an ID number indicating with which remote unit the base unit 10 is communicating.

The base unit 10 transmits the communication signals and the control signals as input signals (transmission signals) to the remote units. That is, the communication signals, such as the voice signals and data signals, are supplied from the telephone transmitter or other various devices (not shown) connected to the interface 48 of the base unit 10. The communication signals are then supplied via the interface 48 to the modulator/demodulator 47, in which the communication signals are modulated into input signals with frequency fIF. The thus modulated signals are supplied to the up converter 41, and are converted into transmission signals fi.

The synchronization signal, the call signal, the connection acknowledge signal, and the busy signal are created in the controller 25, which is connected to the interface 48 of the base unit 10. Those control signals are supplied via the interface 48 to the modulator/demodulator 47. Similarly to the communication signals, those control signals are also modulated into input signals with frequency fIF. The thus modulated signals are supplied to the up converter 41, and are converted into transmission signals fi.

The transmission/reception phase 53 is a transition phase in which the base unit 10 and the remote unit 11, 12, or 13 change from transmission to reception operations or vice versa. During this phase, transmission and reception between the communication devices are not performed.

The reception phase 54 of the base unit 10 (and the transmission phase 64 of the remote unit 11–13) is a period in which signals are transmitted from one of the remote units 11–13 to the base unit 10. In addition to the communication signals such as voice and other data signals, signals transmitted from each remote unit 11–13 include control signals, such as a synchronization verification signal for indicating that synchronization with the base unit 10 has been achieved in the remote unit 4; a call signal for calling the base unit 10 or another remote unit 11–13; a connection acknowledge signal for informing a calling party (the base unit 10 or another remote unit 11–13) that a call signal has been received from that calling communication unit; and a busy signal for indicating that the remote unit is currently being engaged in communication with another communication device.

A synchronization verification signal is transmitted from each remote unit to the base unit 10 in order to verify that a synchronization adjustment has been properly executed at the subject remote unit. If this signal is not transmitted from some remote unit, the base unit 10 can determine that synchronization has not been achieved at that remote unit. The call signal, the connection acknowledge signal, and the busy signal are the same as the signals transmitted from the base unit 10 described above, except that they are transmitted from one of the remote units 11–13 in this case.

Each of the remote units 11–13 transmits the above-described communication signals and control signals as input signals (transmission signals) to the base unit or another remote unit. That is, the communication signals, such as the voice signals and data signals, are supplied from the telephone transmitter or other various devices (not shown) connected to the interface 48 of the remote unit. The communication signals are then supplied via the interface 48 to the modulator/demodulator 47, in which the communication signals are modulated into input signals with frequency fIF. The thus modulated signals are supplied to the up converter 41, and are converted into transmission signals fi.

The synchronization verification signal, the call signal, the connection acknowledge signal, and the busy signal are created in the controller 25, which is connected to the interface 48 of the remote unit. Those control signals are supplied via the interface 48 to the modulator/demodulator 47. Similarly to the communication signals, those control signals are also modulated into input signals with frequency fIF. The thus modulated signals are supplied to the up converter 41, and are converted into transmission signals fi.

As described above, a frame serves as one time unit of communication. Bi-directional communication can be performed in each frame. Hence, bi-directional communication between the devices is performed through repeated execution of these transmission and reception operations over a plurality of frames.

According to the wireless communication system having the above-described structure, communication is possible not only between the base unit 10 and the remote units 11–13, but also between two remote units 11–13 as will be described later. At the beginning of the remote-to-remote communication, the calling remote unit (caller) assumes the role of the base unit 10 described above, operating in units of frames 50. The receiving remote unit (receiver) operates in units of frames 60 in a usual manner as described above. Accordingly, bi-directional communication can be performed between the two remote units.

Each frame 50 or 60 can be used as both: a communication frame for transmitting and receiving communication signals (voice or other data signals); and a control frame for transmitting and receiving control signals such as synchronization signals, synchronization verification signals, call signals, connection acknowledge signals, and busy signals. It is noted, however, that the connection acknowledge signals and verification signals can be transmitted and received also in the communication frames when some remote unit calls the base unit as will be described later.

It is noted that the controller 25 creates each frame 50 or 60 through adding a synchronization signal and code data to transmission data (communication signal or control signal) to be transmitted. The thus frame-shaped created data is inputted via the interface 48 and the modulator/demodulator 47 to the communication unit 22 as input signals fIF. Accordingly, all the frames are created to include synchronization signals.

It is also noted that communication units that have data to transmit perform transmission operations during the transmission phases 52 and 64, However, communication units that have no data to transmit perform reception operations during not only the reception phases 54 and 62 but also during the transmission phases 52 and 64.

Next, the frequency hopping manner employed according to the present embodiment will be described.

The wireless communication system of the present embodiment performs frequency hopping spread spectrum communication, changing the frequency used for communication every frame. More specifically, the frame counter 32 in the hop frequency data generator 21 counts pulse signals input from the clock 30, beginning from zero (0) and counting up to a prescribed number. When the prescribed number is reached, the frame counter 32 resets to zero. This process is performed repeatedly. When the frame counter 32 resets to zero, the frame counter 32 outputs a start hopping signal, and a new frame begins accordingly. The time required for the frame counter 32 to count from 0 to the prescribed number is therefore equivalent to the length of one frame.

The hopping counter 34 increments its counter value by one each time the frame begins. That is, the hopping counter 34 increments its counter value by one each time the frequency hop phase 51 or 61 begins. The beginning of the frequency hop phase is detected when the frame counter 32 is reset to 0 and the frame counter 32 outputs a start hopping signal. The hopping counter 34 is designed as capable of outputting both a communication counter value N and a control counter value M.

It is noted that the counter value N designates the number of communication frames, and the counter value M designates the number of control frames. As will be described later, the communication frames are frames in which communication hop frequency data is generated and control frames are frames in which control hop frequency data is generated. The hopping counter 34 counts up the counter value N from zero (0) to a predetermined maximum value Nmax. The counter value N is reset to zero (0) when the value N exceeds the predetermined maximum value Nmax. Thus, the hopping counter 34 repeatedly outputs the sequence of the counter value N from 0 to Nmax. The hopping counter 34 counts up the counter value M from zero (0) to another predetermined maximum value Mmax. The counter value M is reset to zero (0) when the value M exceeds the predetermined maximum value Mmax. Thus, the hopping counter 34 repeatedly outputs the sequence of the counter value M from 0 to Mmax.

The hopping controller 35 can modify the counter value N issued from the hopping counter 34 and can output the modified counter value N. The modifying method will be described later. Each time the counter value N issued from the hopping counter 34 changes, the hopping controller 35 outputs the same amount of the counter value N or the modified amount of the counter value N as a communication hop number N. Each time the counter value M issued from the hopping counter 34 changes, the hopping controller 35 outputs the same amount of the counter value M as a control hop number M.

The hopping table 36 previously stores therein a communication hop frequency data array D shown in FIG. 4(*a*) and a control hop frequency data array G shown in FIG. 4(*b*). As shown in FIG. 4(*a*), the communication hop frequency data array D Includes a plurality of communication hop frequency data d0, d1, d2, . . . , dN, . . . , and dNmax in correspondence with the communication hop numbers N of zero (0) to Nmax. The communication hop frequency data dN (where $0 \leq N \leq Nmax$) will be used to create the communication frames. The total number of data elements dN constituting the communication hop frequency data array D is n (=Nmax+1). As shown in FIG. 4(*b*), the hop frequency data array G includes a plurality of control hop frequency data g0, g1, g2, . . . , gM, . . . , and gMmax in correspondence with the control hop numbers M of zero (0) to Mmax. The control hop frequency data dM (where $0 \leq M \leq Mmax$) will be used to create the control frames. The total number of data elements gM constituting the control hop frequency data array C is m (=Mmax+1). It is noted that the number m is smaller than the number n. It is also noted that the hop frequency data d1–dNmax and g0–gMmax are set as pseudo random numbers.

According to the present embodiment, as shown in FIG. 4(*c*), during a successive series of frames represented by hop numbers C, a control frame is first created with using the control hop frequency data g0. Then, two or more successive communication frames (ten, in this example) are created with using the communication hop frequency data d1–d10. Then, the next control frame is created with using the control hop frequency data g1. Then, the next two or more successive communication frames (ten, in this example) are created with using the communication hop frequency data d11–d20. This communication operation is repeated. That is, one control frame and two or more successive communication frames are alternately created with using the hop frequency data g0, d1–d10, g1, d11–d20, . . . This operation is repeated.

In other words, in order to create successive series of frames with successive hop numbers C, elements gM ($0 \leq M \leq Mmax$) of the control hop frequency data array G are dispersed throughout the elements dN ($0 \leq N \leq Nmax$) of the communication hop frequency data array D. It can therefore be said that the hopping table 36 is stored with a hop frequency data array FD, which includes elements of both the hop frequency data arrays D and G, as shown in FIG. 4(*c*). Elements in the hop frequency data array FD are indexed by hop numbers C, each of which is indicated by either the communication hop number N or the control hop number M. In this example, as described above, after generating the control hop frequency data g0, the ten successive communication hop frequency data elements d1, d2, . . . , d10 are generated. Subsequently, the control hop frequency data g1 is generated, followed by the communication hop frequency data d11, d12, . . . , d20. This pattern is executed repeatedly.

Since the amount of data used for control signals is generally smaller than the amount of communication data, the total number "m" of the control hop frequency data g0 . . . gMmax can be less than the total number "n" of communication hop frequency data d0–dNmax. Also, since the control frames with the control hop frequency data are dispersed throughout the communication frames with the communication hop frequency data, communication is temporarily interrupted during each control frame. In this example, the communication is interrupted after every ten communication frames are successively performed. However, this interruption in communication is extremely minor because only one control frame is provided between the communication frames. That is, the control hop frequency data is transmitted during only one frame. During communication of voice data, in particular, the human ear cannot even perceive this one-frame interruption. Hence, these interruptions that are provided for transmitting control data have essentially no ill effect on communication. Additionally, according to this method, communication hop frequency data is generated continuously two or more times between each two control frames. In other words, two or more successive communication frames are provided between each two control frames. It is therefore possible to consecutively resend communication data when an error occurs during one communication frame.

According to the present embodiment, the number "p" (=2 or more) of consecutive communication frames are created between every two control frames. In other words, the number "p" of successive communication hop frequency data elements dN are generated between every two control hop frequency data elements gM. In this case, it is desirable that the number "p" satisfies the following equation:

$$n = m \times p.$$

where m represents the total number of control hop frequency data gM, and n represents the total number of communication hop frequency data dN. That is, m=Mmax+1, and n=Nmax+1. By satisfying this equation, all the data elements in the data arrays D and G can be used in each hop cycle. More specifically, frames are successively created during one hop cycle with using the data elements g0, d1–dp, g1, d(p+1)–d(2p), g2, d(2p+1)–d(3p), g3, . . . , g(m−1), and d((m−1)p+1)–d(mp−1), and d0, in this order, where g(m−1)=gMmax, d(mp−1)=dNmax because Mmax=m−1 and Nmax=n−1=mp−1. This hop cycle is repeatedly attained. Thus, data in the hopping table 36 can be effectively used. It is therefore possible to make the hopping table 36 compact.

As described above, the table 36 can be prepared to store only the hop frequency data to be used. However, it is also desirable to provide extra hop frequency data. The extra hop frequency data will be used in place of frequencies that are found to generate many errors during actual communication operation. By replacing those error-prone frequencies with the extra frequencies, it is possible to reduce the number of errors and enable more reliable communication.

According to the present embodiment, the communication hop frequency data elements dN (0≦N≦Nmax) and the control hop frequency data elements gM (0≦M≦Mmax) are retrieved from the hopping table 36 in the order that the data elements gM are dispersed among the data elements dN as shown in FIG. 4(c). The retrieved data elements dN and gM are supplied to the frequency synthesizer 40. When the communication hop frequency data element dN is provided to the frequency synthesizer 40, the frequency synthesizer 40 oscillates at a frequency fdN' in correspondence with a value of the supplied data dN. The frequency fdN' signal is mixed with frequency fIF input signals to create frequency fdN transmission signals. The fdN transmission signals are transmitted to remote devices. The frequency fdN' signal is also mixed with frequency fd reception signals, which are transmitted from remote devices, to recover frequency fIF output signals. Thus, the frequency fdN' signal is used both to convert fIF input signals to fdN transmission signals and to convert fdN reception signals back to fIF output signals.

Similarly, when the control hop frequency data element gM is provided to the frequency synthesizer 40, the frequency synthesizer 40 oscillates at a frequency fgM' in correspondence with a value of the supplied data gM. The frequency fgM' signal is mixed with frequency fIF input signals to create frequency fgM transmission signals. The fgM transmission signals will be transmitted to remote devices. The frequency fgM' signal is also mixed with frequency fgM reception signals, which are transmitted from remote devices, to recover frequency fIF output signals. Thus, the frequency fgM' signal is used both to convert fIF input signals to fgM transmission signals and to convert fgM reception signals back to fIF output signals.

As described above, the hop frequency data FD generated by the hop frequency data generator 21 is continuously changed as the communication hop number N or the control hop number M changes. In this example, the hop frequency data generator 21 generates the hop frequency data g0, d1–d10, g1, d11–d20, . . . (FD) as the hop numbers M and N change as shown in FIG. 4(c). Accordingly, the frequencies fdN and fgM used for transmission and reception by the communication unit 22 also change successively. The hop frequency data dN and gM form one-to-one correspondences with the transmission/reception frequencies fdN and fgM to be used, respectively. It is noted that the hop frequency data d1–dnmax and g0–gMmax are set as pseudo random numbers indicative of randomly-selected frequency values to be oscillated at the frequency synthesizer 40 within a predetermined frequency band. Accordingly, the transmission/reception frequency, at which the communication unit 22 communicates the transmission and reception signals, continuously changes or hops to fg0, fd1–fd10, fg1, . . . in a random manner within the predetermined frequency band. The control frames are attained with the frequencies fg0, fg1, . . . , fgMmax. Thus, the communication unit 22 transmits and receives control signals during those control frames with the frequencies fg0, fg1, . . . , fgMmax. The communication frames are attained with the frequencies fd1, . . . , fdNmax, and fd0. Thus, the communication unit 22 transmits and receives communication signals during those communication frames with the frequencies fd1, . . . , fdNmax, and fd0.

As described above, the hopping controller 35 can modify the counter value N of the hopping counter 34 to a modified communication hop number N. The modifying method used by the hopping controller 35 depends on whether communication is base-to-remote communication or remote-to-remote communication.

More specifically, when performing base-to-remote communication at communication frames, the hopping controller 35 outputs the counter value N of the hopping counter 34 as the communication hop number N without modifying the value. Also when transmitting and receiving control signals at control frames, the hopping controller 35 outputs the counter value M of the hopping counter 34 as the control hop number M without modifying the value. That is, the modification process is not performed during communication frames between the base unit and a remote unit and during all the control frames for attaining the synchronization adjustment operation, or the like. Hence, the added work of the modification process can be skipped simply by determining that communication is to be performed between the base unit and a remote unit, this communication being the most likely combination to be executed.

Still when performing remote-to-remote communication, the hopping controller 35 outputs the counter value M of the hopping counter 34 without change as the control hop number M. Thus, the modification process is not performed for any control frames. However, the modification process is attained onto communication hop frequency data. More specifically, the hopping controller 35 adds a predetermined value S to the counter value N, and outputs the calculated result as the communication hop number N.

In the communication system of the present embodiment employed with the three remote units 11–13, the predetermined value S is either two (2) or four (4). The remote units 11–13 are allocated with remote unit numbers #1–#3. When two of the remote units 11–13 communicate with each other, the remote unit number of the remote unit having the lower number of the two is multiplied by two (2) to determine the value S. In other words, if communication is performed between remote units 11 and 12 (or 13), the lower remote unit number is #1. and therefore two (2) is chosen as the value S. If communication is performed between remote units 12 and 13, the lower remote unit number is #2, and therefore four (4) is chosen as the value S.

FIG. 4(d) shows how the hop frequency data will be selected from the hopping table 36 when S is set to 2 for communication between remote units 11 and 12 (or 13). As apparent from the drawing, the communication hop frequency data dN in FIG. 4(b) is shifted two phases in comparison to the communication hop frequency data dN in FIG. 4(c).

As described above, regardless of any combinations of two remote communication units, it is possible to reliably select the value S of 2 or more based only on their remote unit numbers. Because the lower remote unit number is multiplied by 2, the communication hop frequency data used any two pairs of remote units will be reliably separated by two or more phases. Hence, two pairs of remote units will never use the same frequency, even if disparities occur in the timing of the frequency switches, and will not interfere with each other.

It is noted, however, that the method of choosing the value S is not limited to the above-described method. Various methods can be applied to reliably select the value S so that two combinations of remote units can perform communication simultaneously. For example, the value S can be selected according to the remote unit number of a calling remote unit. Still another possibility would be to divide the total number of remote units in half to obtain a result value R. The total R number of different values are previously set as values possible to be chosen as the value S. According to this method, it is possible to provide several different values S, the total number of which corresponds to the maximum number of possible combination of two remote units. It is noted that when the total number of the remote units is odd, the result R may be obtained through truncating the divided result at the decimal point.

Control frames that use the control hop frequency data gM distributed throughout the communication hop frequency data dN are provided for transmitting and receiving various control signals between all the communication units. It is now assumed that the wireless communication system of the present embodiment uses fifty (50) communication hop frequency data elements dN and five (5) control hop frequency data elements gM. That is, n=Nmax+1=50, and m=Mmax+1=5. In other words, Nmax=49, Mmax=4. In this case, the control hop frequency data elements g0–g4 and the communication hop frequency data elements d0–d49 are retrieved from the hopping table 36 so that the control hop frequency data elements will be distributed among the communication hop frequency data elements. In this case, it is preferable to retrieve the hop frequency data so that ten (p=10) communication hop frequency data elements are successively retrieved between control hop frequency data elements. When generating the hop frequency data as described above, the values of n, m, and p satisfy the relationship n=m×p. All the hop frequency data elements d0–d49 and g0–g4 are used in exactly one hop cycle. That is, hop frequency data g0, d1–d10, g1, d11–d20, g2, d21–d30, g3, d31–d40, g4, d41–d49 and d0 are used in this order in one hop cycle. The hop frequency data is repeatedly used in the same order in the subsequent hop cycles.

In this example, five control frames with data g0–g4 are provided in one hop cycle. It is noted that the total number of the control frames in one hop cycle must be at least equal to the total number of the base unit and the remote units. In this example, therefore, the total number of the control frames should be four or more. If there is a possibility that the number of remote units will increase, a maximum number of additional remote units should be predetermined, and a sufficient number m of control hop frequency data gM should be previously stored in the hopping table 36. A sufficient number of control frames will be created accordingly.

Transmission and reception is performed between all the communication units 10–13 during the control frames because the frequencies fg0–fg4 used in the control frames are used in common by all the communication units. In order to prevent two or more communication units from transmitting control signals simultaneously, therefore, an order of transmission and reception between the base unit 10 and the remote units 11–13 are previously determined.

However, in all the communication frames other than the control frames, only the communication units currently in communication with each other share the same transmission and reception frequency fdN (channel). In this case, the order of transmission and reception concerns only the pair of communication units engaged in the subject communication. Accordingly, communication between those units can be performed without interfering with communication at other channels between other units.

Hereinafter, a data array FD output from the hopping table 36 is referred to as a hop frequency data array B when the counter value N of the hopping counter 34 is not modified by the hopping controller 35 before being outputted as the communication hop number N. The data array FD output from the hopping table 36 will be referred to as a hop frequency data array H1 when the hopping controller 35 modifies the counter value N using the value S of 2 and outputs the modified result as the communication hop number N. The data array FD output from the hopping table 36 will be referred to as a hop frequency data array H2 when the hopping controller 35 modifies the counter value N using the value S of 4 and outputs the modified result as the communication hop number N. An example of the hop frequency data array B includes g0, d1–d10, g1, . . . as shown in FIG. 4(c). An example of the hop frequency data array H1 includes g0, d3–d12, g1, . . . as shown in FIG. 4(d).

Next, the transmission/reception processes executed by the base unit 10 will be described. This process is attained by the controller 25 controlling the entire unit 10. The base unit 10 communicates with remote units 11–13 using the hop frequency data array B.

Figure 5:
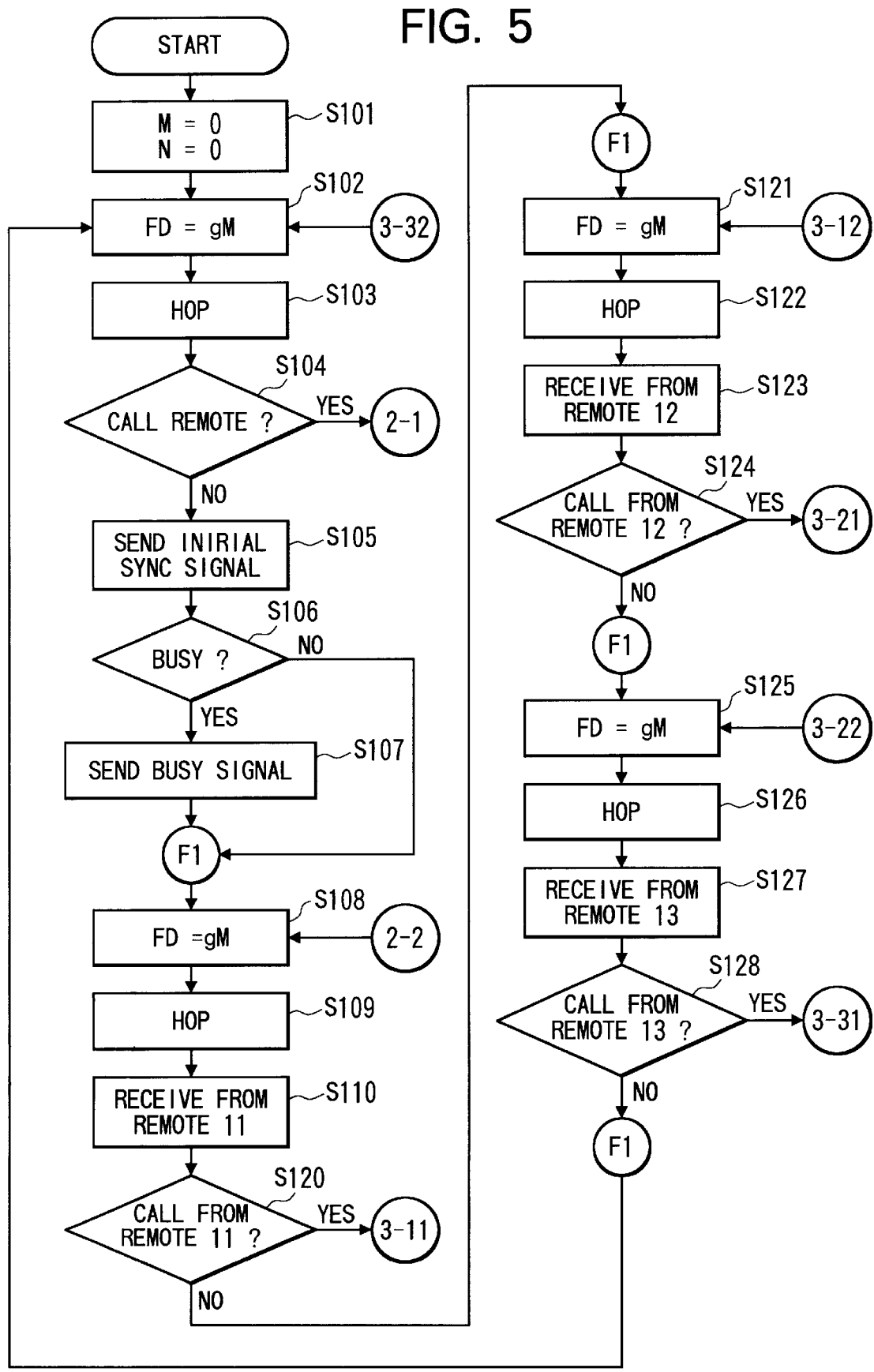
FIG. 5 is a first flowchart showing the transmission and reception processes of the base unit.

As shown in FIG. 5, the counter values M and N of the hopping counter 34 are first initialized to zero (0) in S101. The control hop frequency data g0 is selected from the hopping table 36 in S102. In S103, the base unit 10 hops to the frequency fg0 specified by the present hop frequency data g0, thereby beginning a control frame.

In S104, the base unit 10 checks whether a call is to be made to a desired remote unit. If such a call is not necessary ("no" in S104). the base unit 10 transmits an initial synchronization signal to the remote units 11–13 during a transmission phase 52 in S105. The initial synchronization signal will be used as a standard for performing a series of calling control operation. That is, based on the initial synchronization signal, it is determined that calling control will be performed during the present and subsequent control frames for the base unit 10, the remote unit 11, the remote unit 12, and the remote unit 13 in this order. Thus, the initial synchronization signal serves to determine a timing in which calling control will be started for the units 10 through 13 in this order at the present and subsequent control frames. If the base unit 10 is engaged In communication with one remote unit when transmitting this initial synchronization signal ("yes" in S106), the base unit 10 transmits a busy signal in S107 to inform the other remote units.

After the present control frame is completed, communication frames F1 begin. In the communication frames F1, communication data is transmitted and received using the communication hop frequency data dN. As described later, in the communication frames F1, communication processes are executed while the counter value N is successively incremented. In the communication frames F1, the counter value M is incremented by one. After a series of two or more (p=5, in this example) consecutive communication frames have been completed, the control hop frequency data g1 (M is now one) is selected in S108, and the base unit 10 hops to the corresponding frequency fg0 in S109. In S110, control signals are received from the remote unit 11 in a reception phase 54 of this control frame, thereby performing calling control of the remote unit 11.

If no call signal is received from the remote unit 11 during the reception phase 54 ("no" in S120), after the control frame is completed, the communication frames F1 begin again. During the communication frames F1, communication processes are executed while the counter value N is successively incremented. In the communication frames F1, the counter value M is incremented by one. When the series of five consecutive communication frames is completed, the control hop frequency data g2 (M is now 2) is selected in S121, and the base unit 10 hops to the corresponding frequency fg2 in S122. In S123, control signals are received from the remote unit 12 in the reception phase 54 of the present control frame.

If no call signal is received from the remote unit 12 during the reception phase 54 ("no" in S124), after the present control frame is completed, the communication frames F1 begin again. During the communication frames F1, communication processes are executed while the counter value N is successively incremented. In the communication frames F1, the counter value M is incremented by one. When the series of five consecutive communication frames is completed, the control hop frequency data g3 (M=3) is selected in S125, and the base unit 10 hops to the corresponding frequency fg3 in S126. In S127, control signals are received from the remote unit 13 in the reception phase 54 of the present control frame.

If no call signal is received from the remote unit 13 during the reception phase 54 ("no" in S128), after the present control frame is completed, the communication frames F1 begin again. During the communication frames F1, communication processes are executed while the counter value N is successively incremented. In the communication frames F1, the counter value M is incremented by one. When the series of five consecutive communication frames is completed, the control hop frequency data g4 (M=4) is selected in S102, and the processes for the steps described above are repeated.

It is noted that each of the control signals received from the remote units 11–13 in S110, S123, and S127 includes a synchronization verification signal. Each control signal may also possibly include a call signal for calling the base unit 10. Therefore, in each of the steps S120, S124, and S128, the base unit 10 checks for the existence of a call signal from the corresponding remote unit 11, 12, or 13.

The above-described processes S102–S128 are executed repeatedly. However, instead of executing the processes continuously, it is possible to execute the processes at specified intervals. In addition, it is possible to control the base unit 10 to execute continuously, while the remote units 11–13 respond at specified intervals, rather than responding every time. With this latter method, the number of transmissions performed in responding can be decreased, thereby decreasing battery consumption.

Figure 6:
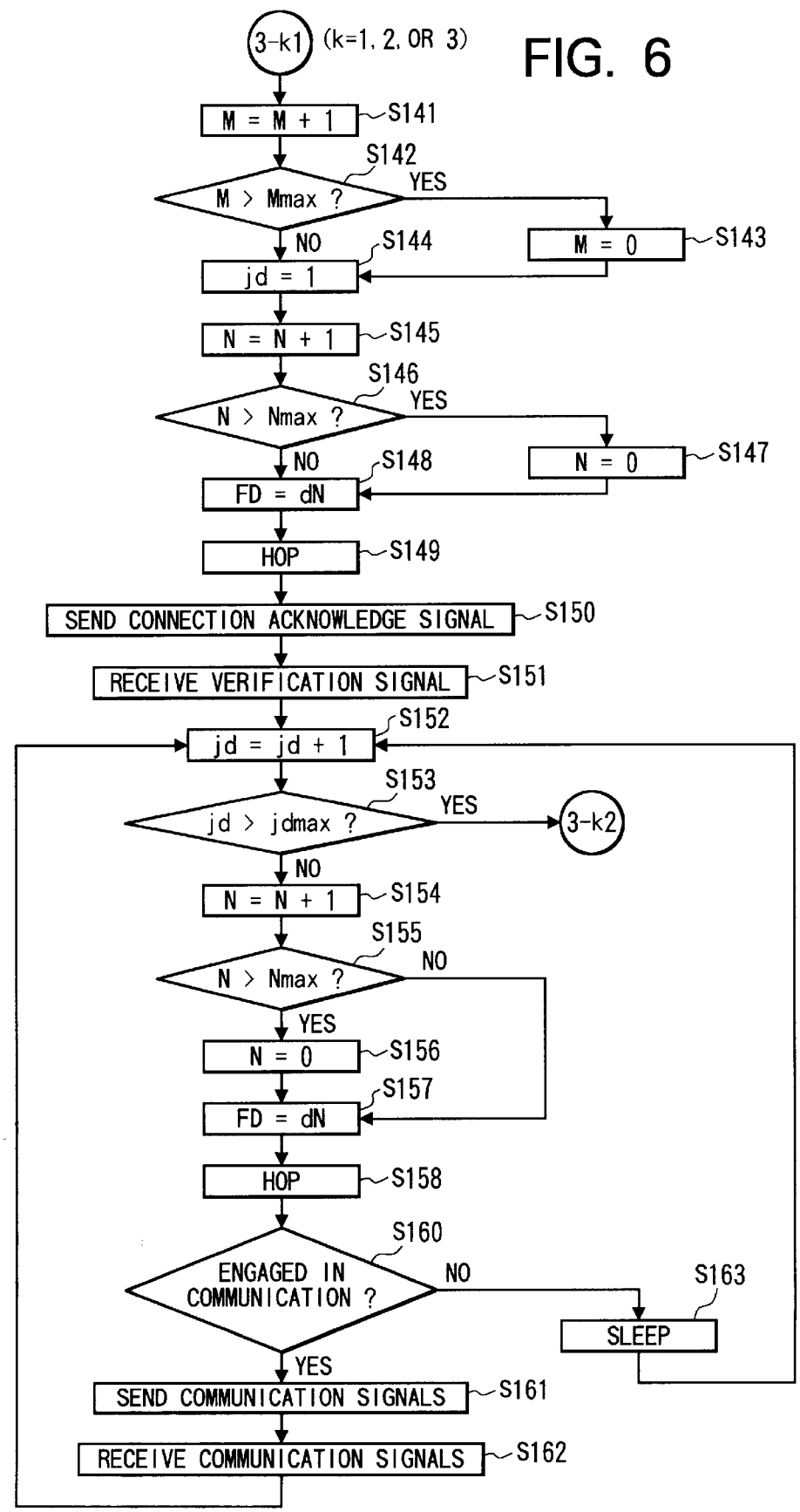
FIG. 6 is a second flowchart showing the transmission and reception processes of the base unit.

In S120, if the base unit 10 receives a call signal from the remote unit 11 ("yes" in S120), the process of FIG. 6, indicated by 3-k1 (k is the remote number # of the calling remote unit; in this case, 1), is executed.

In the process 3-k1, the counter value M of the hopping counter 34 is incremented in S141. If M becomes greater than the maximum value Mmax ("yes" in S142), then M is reset to zero (0) in S143.

In S144, a communication frame counter jd is reset to one (1). The counter jd is indicative of the number of consecutive communication frames which have been performed in the present routine 3-k1. The communication counter value N, which indexes or indicates the communication hop frequency data dN, is incremented by one (1) in S145. If the counter value N becomes greater than Nmax ("yes" in S146), then N is reset to 0 in S147.

Then, in S148, the communication frequency hop data d1 (=dN; N is now 1 in this example) is selected, and the base unit 10 hops to the corresponding frequency fd1 in S149. Thus, a communication frame starts. That is, in S150, the base unit 10 transmits a connection acknowledge signal to the remote unit 11 during the transmission phase 52 of the same frame. When the base unit 10 receives a verification signal from the remote unit 11 in the reception phase 54 of the same frame in S151, base-to-remote communication begins in the next communication frame with the frequency fd2.

At the beginning of the base-to-remote communication, the communication frame counter jd is incremented in S152. When communication hop frequency data dN is generated continuously a predetermined number of frames represented by jdmax (=p), which in the present example is five (5=p), ("yes" in S153), the base unit 10 returns to the control frame through S121. However, if the number of continuous communication frames has not yet reached the prescribed number jdmax ("no" in S153), then the count value N is incremented in S154. If the count value N exceeds the maximum value Nmax ("yes" in S155), then N is reset to 0 in S156. Next, the corresponding hop frequency data dN (FD) is selected in S157, and the base unit 10 hops to the corresponding frequency fdN in S158. When the base unit 10 is currently communicating with the remote unit 11 ("yes" in S160), then in S161 the base unit 10 transmits communication signals in the transmission phase 52 of the same frame and in S162 receives communication signals from the remote unit 11. However, if communication has been completed or the base unit 10 is currently not engaged in communication ("no" in S160), then the base unit 10 enters a sleep state in S163 to conserve power. The process described above is repeated until communication hop frequency data dN has been generated continuously for the specified number jdmax (=5).

When the count value N exceeds the maximum number Nmax of the usable communication hop frequency data ("yes" in S146 and S155) after being incremented in S145 and S154, then N is reset to 0 in S147 and S156, respectively.

The operations the same as described above are performed also when the base unit 10 receives call from the remote unit 12 in S124 and when the base unit receives call from the remote unit 13 in S128.

Figure 7:
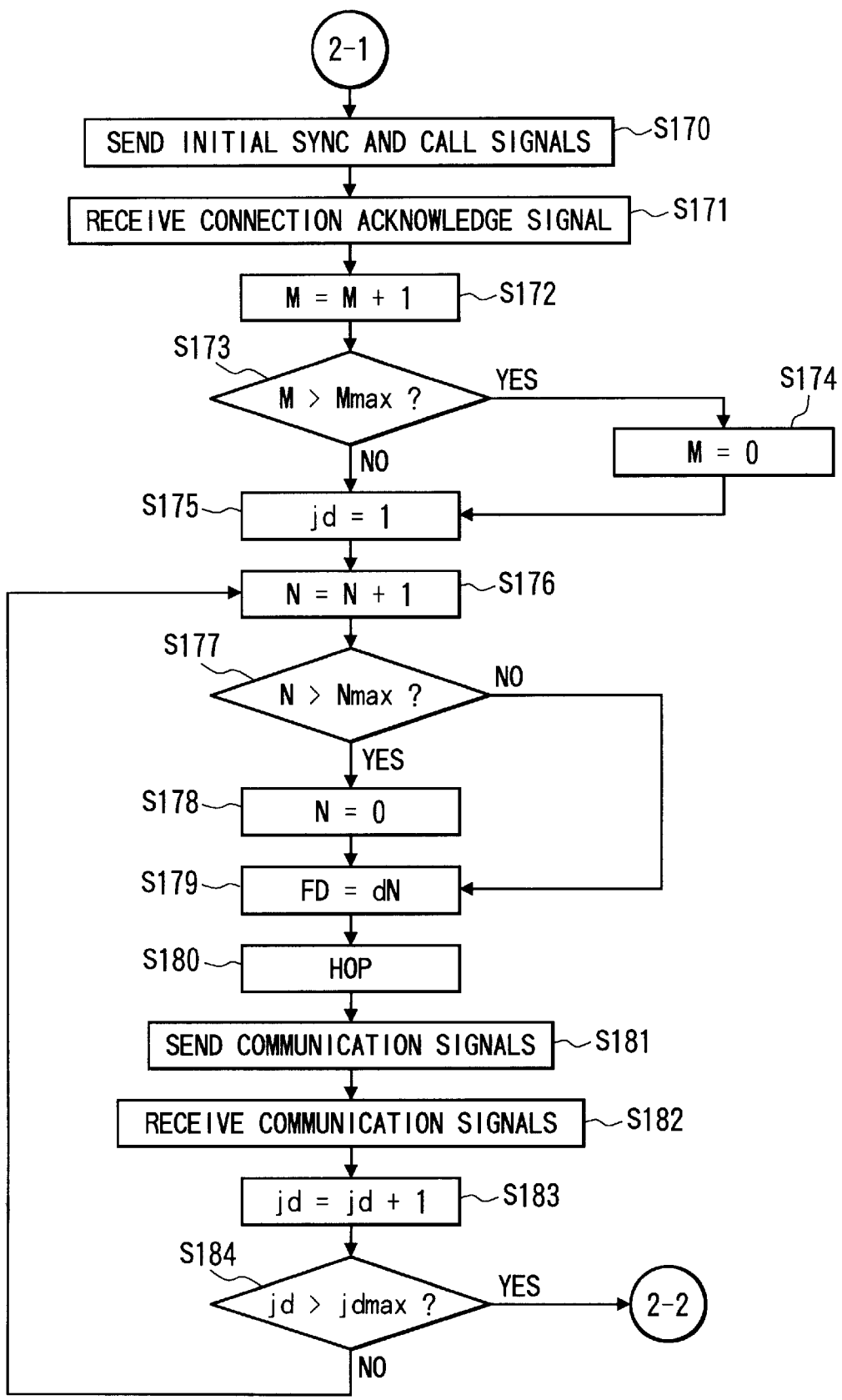
FIG. 7 is a third flowchart showing the transmission and reception processes of the base unit.

Returning to FIG. 5, when the user of the base unit 10 places a call to one of the remote units 11–13 ("yes" in S104), then the process shown in FIG. 7 is executed. This process will be described below.

In S170, the base unit 10 transmits an initial synchronization signal and a call signal for a specific remote unit during the transmission phase 52 of the present control frame. The call signal includes an ID to indicate the specific remote unit. Although all of the remote units 11–13 actually receive the call signal, only the remote unit specified by the ID number recognizes that signal. The following example will describe the case of the base unit 10 calling the remote unit 12.

During the reception phase 54 of the same control frame, when the base unit 10 immediately receives a connection acknowledge signal from the remote unit 12 in S171, communication between the two communication units begins in the next communication frame. In this way, time required before communication begins after a call signal becomes extremely short.

In S172, the counter value M is incremented. Similarly as described above, if M becomes greater than Mmax ("yes" in S173), then M is reset to 0 in S174. In S175, the communication frame counter jd is reset to 1. The counter value N for the communication hop frequency data dN is incremented in S176. Similarly as described above, if the counter value N becomes greater than Nmax ("yes" in S177), then N is reset to 0 in S178. The corresponding communication hop frequency data dN (FD) is selected in S179, and the base unit 10 hops to the corresponding frequency fdN in S180. In S181, the base unit 10 transmits communication signals in the transmission phase 52 of the present frame and in S182 receives communication signals from the remote unit 12 during the reception phase 54 of the same frame. The communication frame counter jd is incremented in S183. When communication hop frequency data dN has been generated continuously the prescribed number of frames jdmax ("yes" in S184), the base unit 10 returns to the control frame through S108. However, if the number of continuous communication frames has not yet reached the prescribed number jdmax ("no" in S184), then the count value N is incremented in S176, and the communication continues. Communication hop frequency data dN is repeatedly generated until the number of continuous communication frames reaches jdmax.

It is noted that the base unit 10 might not receive a connection acknowledge signal in S171 from the remote unit 12 because, for example, the remote unit 12 is already engaged in communication with another communication unit; the remote unit 12 is not properly synchronized with the base unit 10; the remote unit 12 is out of a certain communication range; the battery in the remote unit 12 is dead; or the like. In such cases, the base unit 10 notifies the user that communication with the remote unit is not possible by emitting an audible signal from the telephone receiver, or a similar method of notification.

Figure 8:
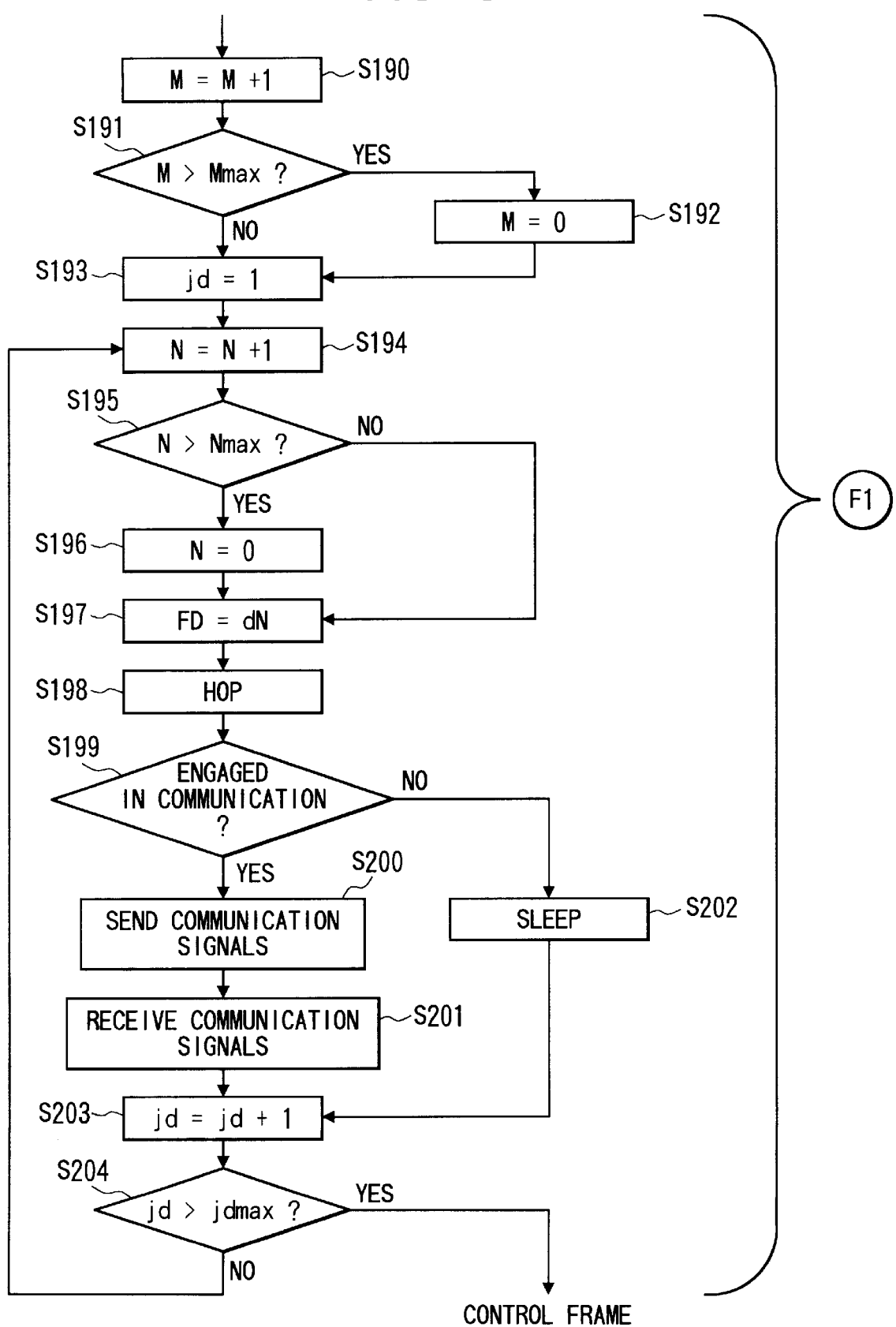
FIG. 8 is a fourth flowchart showing the transmission and reception processes of the base unit.

Next, the operations of the base unit 10 during the communication frames F1 will be described with reference to FIG. 8. This process begins when the base unit 10 transfers from a control frame to the communication frames F1. First, the counter value M of the hopping counter 34 is incremented in S190. Similarly as described above, if M becomes greater than Mmax ("yes" in S191), then M is reset to 0 in S192. In S193, the communication frame counter jd is reset to 1. The counter value N for the communication hop frequency data dN is incremented in S194. Similarly as described above, if the counter value N becomes greater than Nmax ("yes" in S195), then N is reset to 0 in S196. The corresponding communication hop frequency data dN (FD) is selected in S197, and the base unit 10 hops to the corresponding frequency fdN in S198. Thus, the present communication frame begins. If the base unit 10 is currently engaged in communication with one remote communication unit ("yes" in S199), then in S200 the base unit 10 transmits communication signals in the transmission phase 52 of the same frame and in S201 receives communication signals from a remote unit (12, for example) in the reception phase 54 of the same frame. However, if communication has been completed or the base unit 10 is currently not engaged in actual communication ("no" in S199), then the base unit 10 enters a sleep state in S202 to conserve power.

In S203, the communication frame counter jd is incremented. If communication hop frequency data dN has been generated continuously the specified number of times jdmax ("yes" in S204). the base unit 10 returns to the control frame in S102, S108, S121, or S125. However, if communication hop frequency data has not yet been generated continuously the specified number of times jdmax ("no" in S204), then the counter value N is incremented in S194, and the communication continues. Hence, communication hop frequency data is continuously generated for the specified number of times jdmax.

Each of the remote units 11–13 executes transmission and reception processes as shown in FIGS. 9–14 while the base unit 10 is executing the processes of FIGS. 5–8 described above. That is, the controller 25 in each remote unit controls the entire remote unit to perform the processes of FIGS. 9–14. The following description will be given for the remote unit 12. However, the remote units 11 and 13 perform the similar transmission and reception processes.

Figure 9:
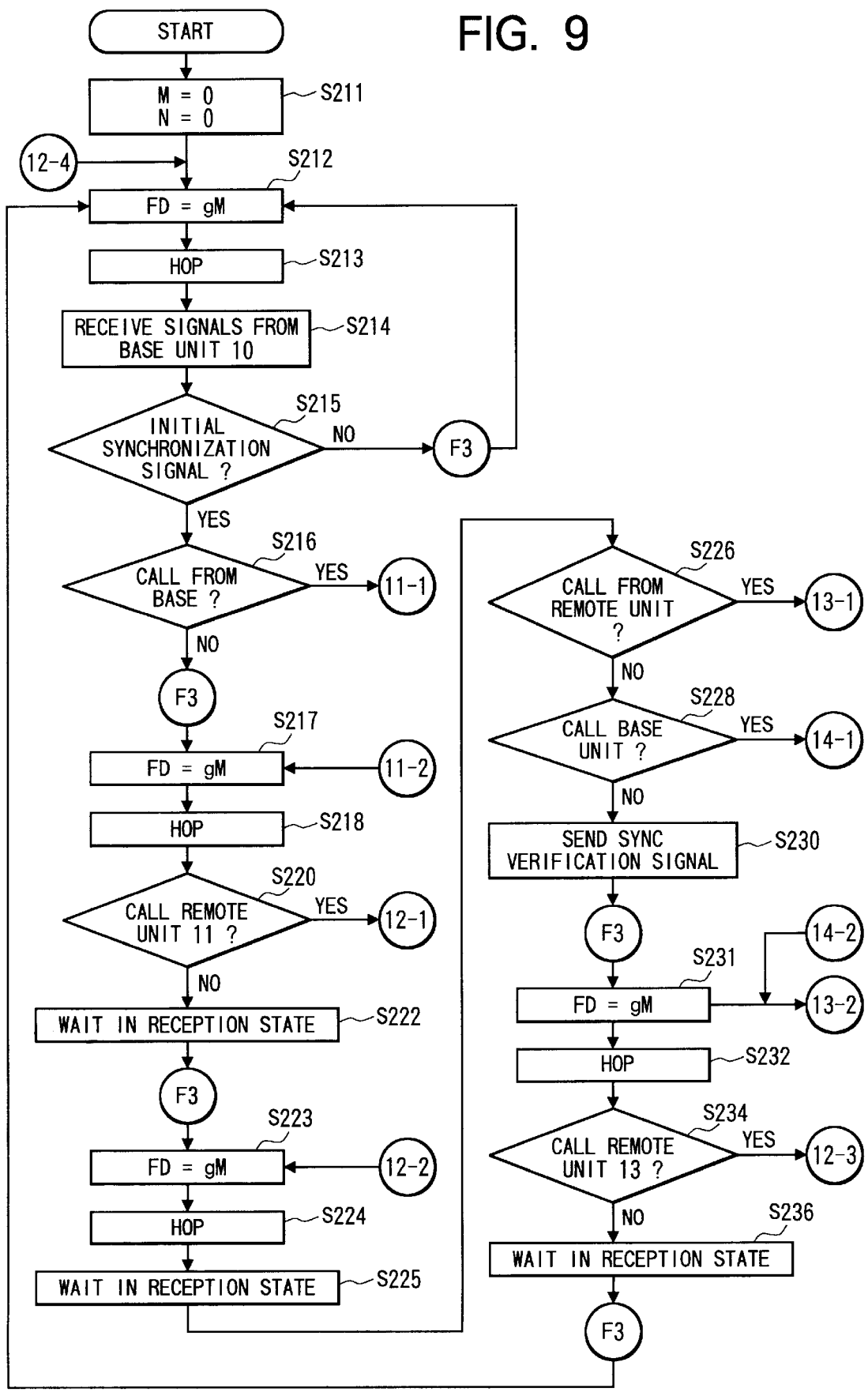
FIG. 9 is a first flowchart showing the transmission and reception processes of the remote unit.

As shown in FIG. 9, the counter values M and N of the hopping counter 34 are first reset in S211. The corresponding control hop frequency data gM (g0) is selected In S212, and the remote unit 12 hops to the corresponding frequency fgM (fg0) in S213. In S214, a control signal is received from the base unit 10 during the reception phase 62 of the present control frame. The control signal includes a synchronization signal and may possibly include a call signal from the base unit 10. With using the synchronization signal, the frame controller 32 is reset by the controller 25. The controller 25 confirms that synchronization is attained with the base unit 10.

If the control signals include an initial synchronization signal ("yes" in S215), then a series of call control processes begin from the next step. However, if the control signals do not include an initial synchronization signal ("no" in S215), the remote unit 12 proceeds to communication frames F3, After completing the communication frames F3, the remote unit 12 returns to a control frame through S212. This procedure is repeated until an initial synchronization signal is received from the base unit 10. As described later, during the communication frames F3, consecutive communication frames are achieved as the counter value N is successively incremented.

When an initial synchronization signal is received from the base unit 10 ("yes" in S215), the series of calling control is started. That is, the remote unit 12 first judges in S216 whether a call signal has been received from the base unit 10. If a call signal has not been received ("no" in S216), then the remote unit 12 enters the communication frames F3 and executes successive series of transmission and reception operations while successively incrementing the communication hop frequency data. During these communication frames F3, the counter value M is incremented by one.

After the communication frames F3 are completed, the communication hop frequency data gM corresponding to the present value M is selected in S217, and the remote unit, 12 hops to the frequency fgM corresponding to that data in S218. Thus, the control frame is started. Then, the remote unit 12 judges in S220 whether the user of the remote unit 12 has indicated a desire to call the remote unit 11. If the remote unit 12 is to call the remote unit 11 ("yes" in S220), then a call between the present remote unit 12 and the remote unit 11, which will be described later, begins in the next frame. However, if the remote unit 12 is not to call the remote unit 11 ("no" in S220), the remote unit 12 waits in a reception state during both the reception and transmission phases 62 and 64 of the current frame in S222.

Once again, the remote unit 12 enters the communication frames F3, during which frames the counter value M is incremented. After completion of the communication frames, the control hop frequency data gM corresponding to the present value M is selected in S223, and the remote unit 12 hops to the frequency fgM corresponding to that data in S224. In S225, the remote unit 12 receives control signals from the remote unit 11 or the remote unit 13 during the reception phase of the same control frame. If the control signals include a call signal from a remote unit 11 or 13 ("yes" in S226), then a call between the remote unit 12 and the calling remote unit, which will be described later, begins in the next frame. However, if no call signal has been received from any remote unit ("no" in S226), then the remote unit 12 determines in S228 whether a call is to be made to the base unit 10. If the base unit 10 is to be called ("yes" in S228), then a call between the base unit 10 and the remote unit 12, described later, begins in the next frame. However, if the remote unit 12 is not to call the base unit 10 ("no" in S228), then the remote unit 12 transmits a synchronization verification signal in S230 during the transmission phase of the same frame. The synchronization verification signal indicates that the remote unit 12 has been synchronized with the base unit 10.

Next, the remote unit 12 enters the communication frames F3, in which frames the counter value M is incremented. After the communication frames F3 are completed, the control hop frequency data gM corresponding to the present value M is selected in S231, and the remote unit 12 hops to the frequency fgM corresponding to that data in S232. Next, the remote unit 12 determines in S234 whether the user has Indicated a desire to call the remote unit 13. If the remote unit 12 is to call the remote unit 13 ("yes" in S234), then a call between the remote units 12 and 13, which will be described later, begins in the next frame. However, if the remote unit 12 is not to call the remote unit 13 ("no" in S234), the remote unit 12 waits in a reception state during both the reception and transmission phases of the current frame in S236.

Once again, the remote unit 12 enters the communication frames F3, in which the counter value M is incremented, and returns to S212 after completing the frames F3.

The processes described above are repeated from S212. It is noted, however, that rather than repeating the entire series of processes again immediately, the remote unit 12 can maintain a sleep state for a specified time after completion of S236, in order to conserve power. By not performing communication during this sleep state, the remote unit 12 can decrease battery consumption and increase its overall communication time. After maintaining a sleep state for the specified amount of time, the remote unit 12 wakes by ending its power conserving state and returns to S212.

Figure 10:
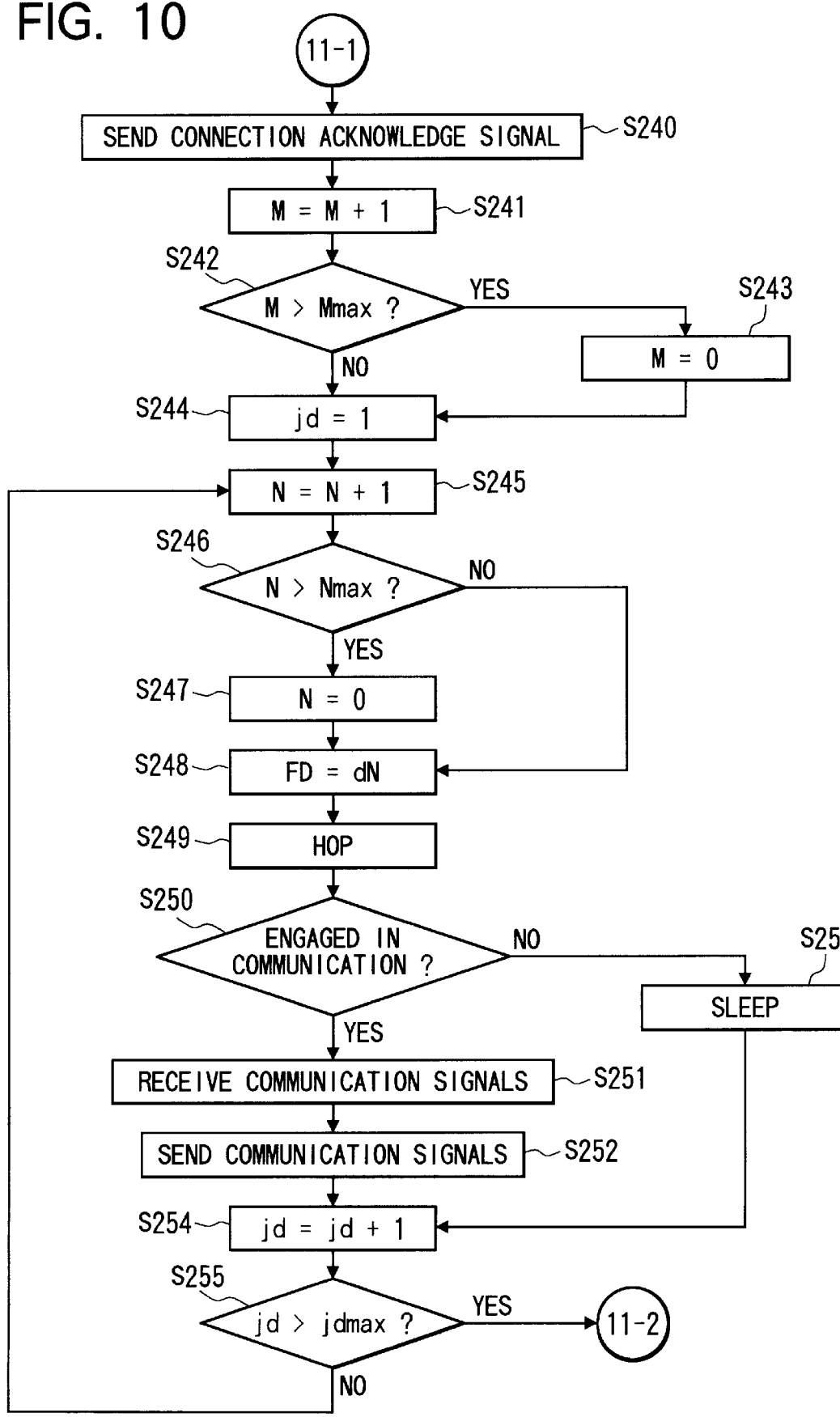
FIG. 10 is a second flowchart showing the transmission and reception processes of the remote unit.

In S216 of FIG. 9, when the remote unit 12 has received a call signal from the base unit 10 ("yes" in S216), then the remote unit 12 immediately transmits a connection acknowledge signal to the base unit 10 during the transmission phase of the same frame, as shown in S240 of FIG. 10.

Then, the counter value M is incremented in S241. Similarly as described above, if M becomes greater than Mmax ("yes" in S242), then M is reset to 0 in S243. In S244, the communication frame counter jd is reset to 1. The counter value N for the communication hop frequency data dN is incremented in S245. If the counter value N becomes greater than Nmax ("yes" in S246), then N is reset to 0 in S247. The corresponding communication hop frequency data dN is then selected in S248, and the remote unit 12 hops to the corresponding frequency fdN in S249. Thus, the communication frame starts. If the remote unit 12 is currently engaged in communication ("yes" in S250), then in S251 the remote unit 12 receives communication signals from the base unit 10 in the reception phase of the same frame and in S252 transmits communication signals to the base unit 10 in the transmission phase of the same frame. However, if communication has been completed or the remote unit 12 is currently not engaged in communication ("no" in S250), then the remote unit 12 enters a sleep state in S253 to conserve power.

In S254, the communication frame counter jd is incremented. If communication hop frequency data has been generated continuously the specified number of times jdmax ("yes" in S255), the remote unit 12 returns to the control frame through S217. However, if communication hop frequency data has not yet been generated continuously the specified number of times jdmax ("no" in S255), then the counter value N is incremented in S245, and the communication continues. Hence, communication hop frequency data is continuously generated for the specified number of times jdmax.

When the remote unit 12 is to call another remote unit during the process of FIG. 9 ("yes" in S220 or S234), the order of the transmission and reception phases in each frame is switched for the remote unit 12, and the following process is executed. The following description is for the example of the remote unit 12 calling the remote unit 13 ("yes" in S234). However, the process executed by the remote unit 12 when calling the remote unit 11 is exactly the same.

Figure 11:
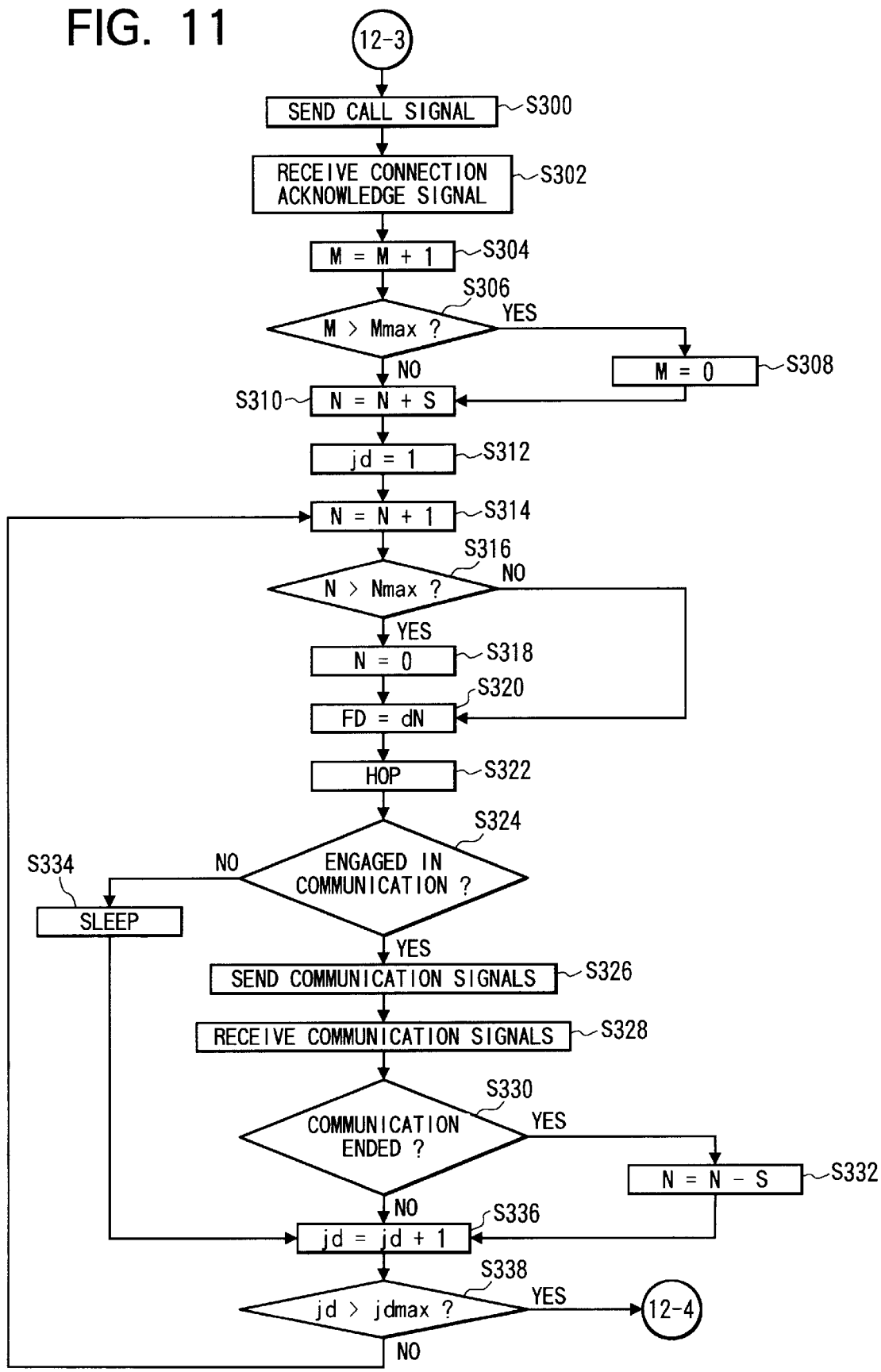
FIG. 11 is a third flowchart showing the transmission and reception processes of the remote unit.

As shown in FIG. 11, in S300 the remote unit 12 transmits a call signal for the remote unit 13 during the transmission phase of the current frame and, in S302, receives a connection acknowledge signal from the remote unit 13 during the reception phase of the same frame. This transmission and reception exchange verifies that the remote units 12 and 13 can connect with each other. The counter value M is incremented in S304. If M becomes greater than Mmax ("yes" in S306), then M is reset to 0 in S308.

In S310, the remote unit 12 begins to add the specified value S to the present counter value N in order to create a modified communication hop number N. In the present example, the specified value S equals 4. This is determined using the method described above. Since, the remote unit 12 and remote unit 13, having remote unit numbers #2 and #3, respectively are communicating, the lowest of these numbers, #2, multiplied by 2 equals 4. If the remote unit 12 were communicating with the remote unit 11, having a remote unit number of #1, then the specified value S would equal 2.

In S312, the communication frame counter jd is reset to 1. The value N for the communication hop frequency data dN is incremented in S314. If the value N becomes greater than Nmax ("yes" in S316), then N is reset to 0 in S318. The corresponding communication hop frequency data dN is then selected in S320, and the remote unit 12 hops to the corresponding frequency fdN in S322. If the remote unit 12 is currently engaged in communication ("yes" in S324), then in S326 the remote unit 12 transmits communication signals to the remote unit 13 in the transmission phase of the frame and in S328 receives communication signals from the remote unit 13 in the reception phase of the same frame. Communication between the two remote units thus begins. If communication has ended ("yes" in S330), then the specified value S is subtracted from the counter value N in S332 to return N to the original phase. If the remote unit 12 Is currently not engaged in communication ("no" in S324), on the other hand, the remote unit 12 enters a sleep state in S334 to conserve power.

Beginning from the above-described communication frame, the remote units 12 and 13 communicate with each other by generating a communication hop number N using the specified value S of 4 and by hopping to communication frequencies fdN which are determined based on the remote-to-remote communication hop frequency data dN that has been generated according to the modified hop number N. As a result of this process, the two remote units are generating hop frequency data that is shifted four phases in relation to the hop frequency data generated by the bass unit 10 and remote unit 11 according to the above-described process. Accordingly, the two pairs of communication units can communicate on different channels not using the same frequencies. Hence, if the base unit 10 and remote unit 11 were to begin communication at this time, they would not interfere with the communication of the remote units 12 and 13.

In S336, the communication frame counter jd is incremented. If communication hop frequency data has been generated continuously the specified number of times jdmax ("yes" in S338), the remote unit 12 returns to the control frame beginning from S212 in FIG. 9. However, if communication hop frequency data has not been generated continuously the specified number of times jdmax ("no" in S338), then the counter value N is incremented in S314, and the communication continues. Hence, communication hop frequency data is continuously generated for the specified number of times jdmax.

In the process of FIG. 9, if the remote unit 12 receives a call signal from the remote unit 11 or 13 in S226 ("yes" in S226), then a call begins between the two remote units. The following example will describe the processes performed by the remote unit 12 when receiving a call signal from the remote unit 13. However, the process is the same when the remote unit 12 receives a call signal from the remote unit 11.

Figure 12:
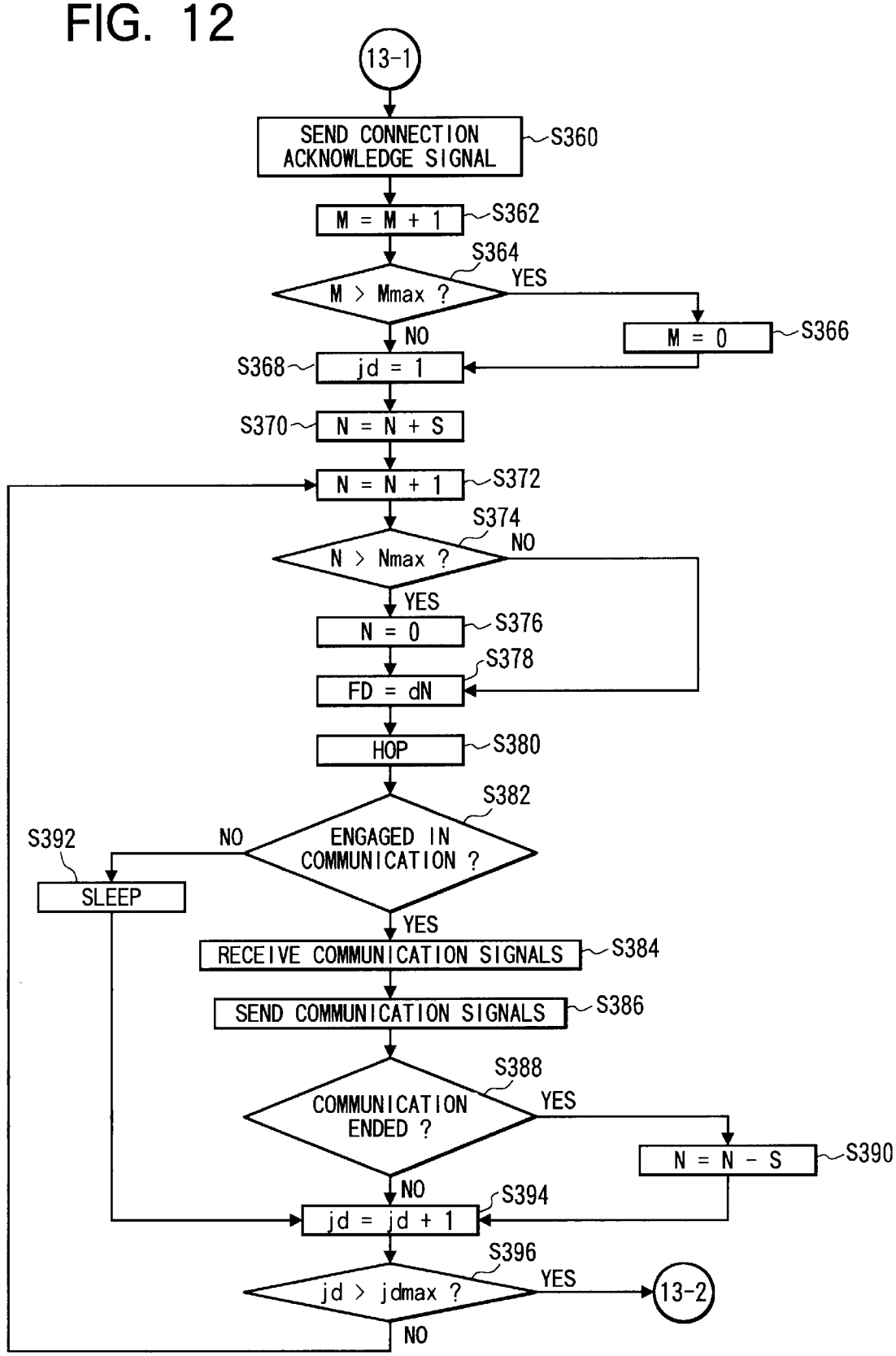
FIG. 12 is a fourth flowchart showing the transmission and reception processes of the remote unit.

As shown in FIG. 12, in S360 the remote unit 12 transmits a connection acknowledge signal for the remote unit 13 during the transmission phase of the current frame. The counter value M is incremented in S362. If M becomes greater than Mmax ("yes" in S364), then M is reset to 0 in S366.

In S368, the communication frame counter jd is reset to 1. In S370, the remote unit 12 begins to add the specified value S (4, in this example) to the counter value N in order to create a modified communication hop number N. The value N for the communication hop frequency data dN is then incremented in S372. If the value N becomes greater than Nmax ("yes" in S374), then N is reset to 0 in S376. The corresponding communication hop frequency data dN is then selected in S378, and the remote unit 12 hops to the corresponding frequency fdN in S380. If the remote unit 12 is currently engaged in communication ("yes" in S382), then in S384 the remote unit 12 receives communication signals from the remote unit 13 in the reception phase of the frame, and in S386 transmits communication signals to the remote unit 13 in the transmission phase of the some frame. Thus, communication between the two remote units begins. If communication has ended ("yes" in S388), then the specified value S is subtracted from the value N in S390 to return N to the original phase. However, if the remote unit 12 is currently not engaged in communication ("no" in S382), then the remote unit 12 enters a sleep state in S392 to conserve power.

Beginning from the above-described communication frame, the remote units 12 and 13 communicate with each other by generating a communication hop number N modified with using the specified value S=4, and by hopping to communication frequencies determined based on the remote-to-remote unit communication hop frequency data that has been generated according to the modified hop number N as described above. As a result of this process, the two remote units are generating hop frequency data that is shifted four phases in relation to the hop frequency data generated by the base unit 10 and remote unit 11. Accordingly, the two pairs of communication units can communicate on different channels not using the same frequencies. Hence, if the base unit 10 and remote unit 11 were to begin communication at this time, they would not interfere with the communication of the remote units 12 and 13.

In S394, the communication frame counter jd is incremented. If communication hop frequency data has been generated continuously the specified number of times jdmax ("yes" in S396), the remote unit 12 returns to the control frame beginning from S231 in FIG. 9. However, if communication hop frequency data has not been generated continuously the specified number of times jdmax ("no" in S396), then the counter value N is incremented in S372, and the communication continues. Hence, communication hop frequency data is continuously generated for the specified number of times jdmax.

Figure 13:
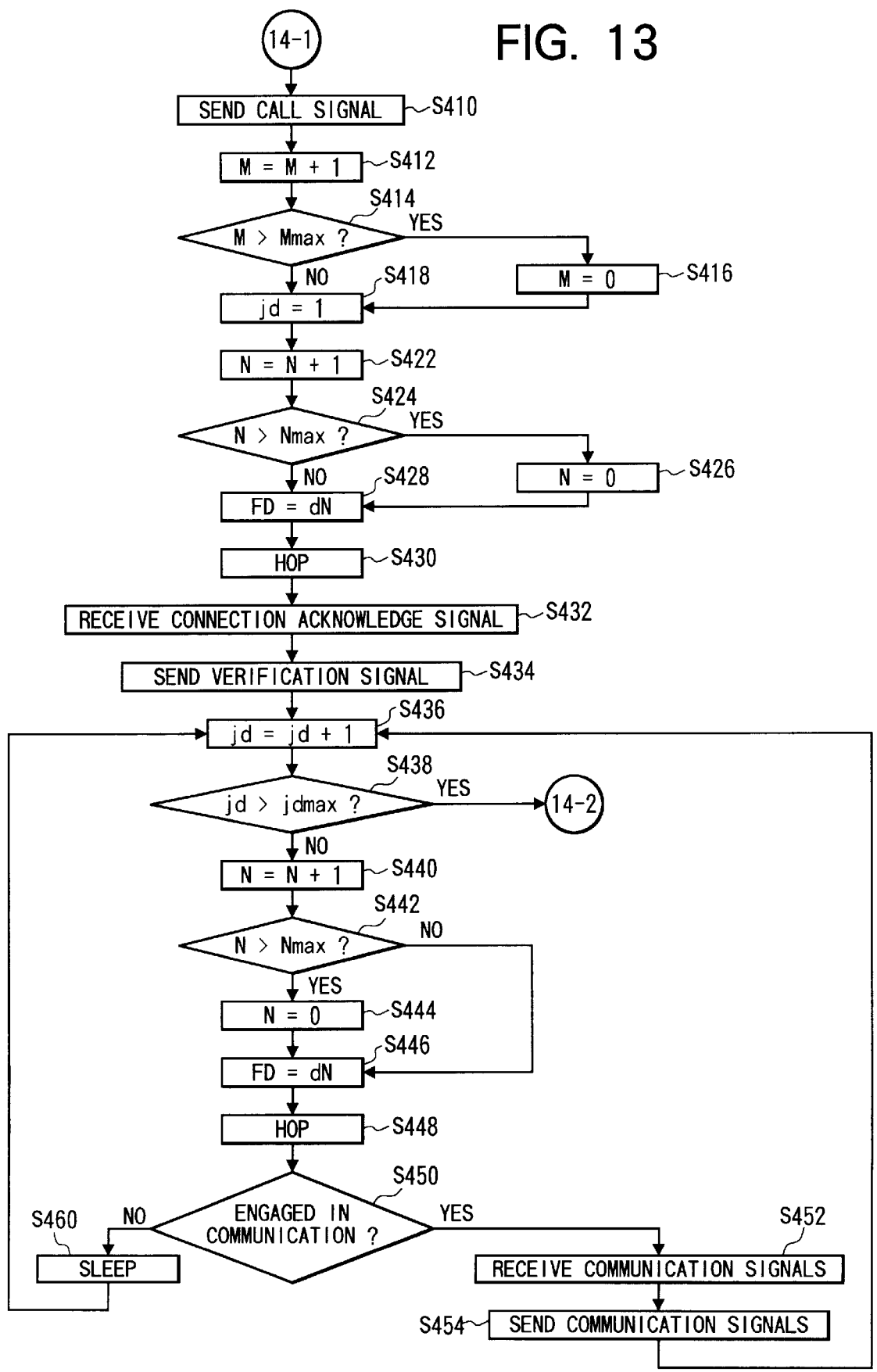
FIG. 13 is a fifth flowchart showing the transmission and reception processes of the remote unit.

In the process of FIG. 9, if the remote unit 12 is to call the base unit 10 in S228 ("yes" in S228), then a call begins between the remote unit 12 and the base unit 10 as shown in FIG. 13.

That is, in S410, the remote unit 12 transmits a call signal to the base unit 10 during the transmission phase of the current frame. The counter value M is incremented in S412. If M becomes greater than Mmax ("yes" in S414), then M is reset to 0 in S416. In S418, the communication frame counter jd is reset to 1. The counter value N for the communication hop frequency data is incremented in S422. If the counter value N becomes greater than Nmax ("yes" in S424), then N is reset to 0 in S426. The corresponding communication hop frequency data dN is then selected in S428, and the remote unit 12 hops to the corresponding frequency fdN in S430. In the reception phase of that frame, the remote unit 12 receives a connection acknowledge signal from the base unit 10 in S432, and transmits a verification signal to the base unit 10 in S434 in the transmission phase of the same frame.

Subsequently, the communication frame counter jd is incremented in S436. When communication hop frequency data is generated continuously the prescribed number of frames represented by jdmax ("yes" in S438), the remote unit 12 returns to the control frame in S231 of FIG. 9. However, if the number of continuous communication frames has not yet reached the prescribed number jdmax ("no" in S438), then the count value N is incremented in S440. If the count value N exceeds the maximum value Nmax ("yes" in S442), then N is reset to 0 in S444. Communication hop frequency data is continuously generated for the prescribed number of frames jdmax.

When the count value N is incremented in S440, S442, or S444, the corresponding hop frequency data dN (=Fd) is selected in S446, and the remote unit 12 hops to the corresponding frequency fdN in S448. If the remote unit 12 is currently engaged in communication ("yes" in S450), then in S452 the remote unit 12 receives communication signals from the base unit 10 during the reception phase of the current frame and in S454 transmits communication signals to the base unit 10 during the transmission phase of the same frame, thus beginning communication between the two communication units. However, if the remote unit 12 is currently not engaged in communication ("no" in S450), then the remote unit 12 enters a sleep state in S460 to conserve power.

According to the processes described above, base-to-remote communication between the base unit 10 and the remote units 11–13 and also direct remote-to-remote communication between the remote units 11–13 can be performed independent from one another.

Figure 14:
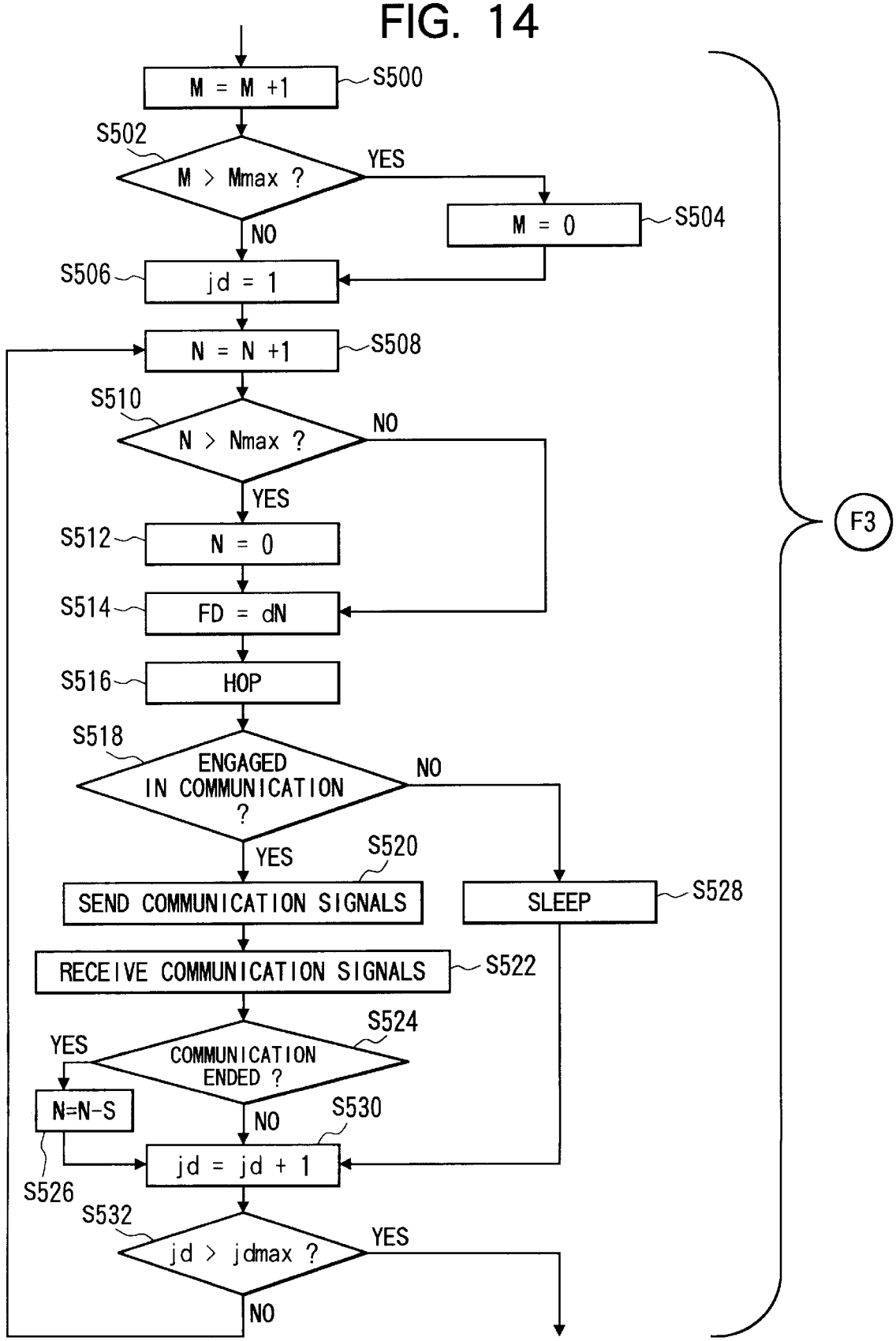
FIG. 14 is a sixth flowchart showing the transmission and reception processes of the remote unit.

Next, the communication operations performed by the remote unit (12, in this example) in the communication frames F3 will be described with reference to FIG. 14.

When the remote unit 12 transfers from a control frame to the communication frames F3, the counter value M is incremented in S500. If M becomes greater than Mmax ("yes" in S502), then M is reset to 0 in S504.

In S506, the communication frame counter jd is reset to 1. In S508, the counter value N for the communication hop frequency data is incremented. If the counter value N becomes greater than Nmax ("yes" in S510), then N is reset to 0 in S512. The corresponding communication hop frequency data dN is then selected in S514, and the remote unit 12 hops to the corresponding frequency in S516.

If the remote unit 12 is currently engaged in communication with another remote unit ("yes" in S518) as a caller, then in S520 the remote unit 12 transmits communication signals to that remote unit during the transmission phase of the frame and in S522 receives communication signals from the remote unit in the reception phase of the same frame. If communication has ended ("yes" in S524), then the specified value S is subtracted from the counter value N in S526 to return N to the original phase. However, if the remote unit 12 is currently not engaged in communication ("no" in S518), then the remote unit 12 enters a sleep state in S528 to conserve power. It is noted that if the remote unit 12 is currently engaged in communication with the base unit 10 or is currently engaged in communication with another remote unit as a receiver ("yes" in S518), then the transmission and reception operations of S520 and S522 are reversed. If the remote unit 12 is communicated with the base unit 10 (yes in S518), when the communication is ended (yes in S524), the process of S526 is skipped.

In S530, the communication frame counter jd is incremented. If communication hop frequency data has been generated continuously the specified number of times jdmax ("yes" in S532), the remote unit 12 returns to the control frame in FIG. 9, However, if communication hop frequency data has not been generated continuously the specified number of times jdmax ("no" in S532), then the counter value N is incremented in S508, and the communication continues. Hence, communication hop frequency data is continuously generated for the specified number of times jdmax.

It is noted that the above description for FIGS. 9–14 is given for the remote unit 12. The remote units 11 and 13 perform the processes the same as that of FIGS. 9–14 except that the order in performing the various control operations in the successive control frames in FIG. 9 is changed.

As described above with reference to FIG. 9, for the remote unit 12, the processes S212–S216, the processes S217–S222, the processes S223–S230, and the processes S231–S236 are conducted in this order in the successive four (first through fourth) control frames. That is, when receiving an initial synchronization signal at a certain control frame (first control frame) in S215, the remote unit 12 starts communication with the base unit 10 in the same control frame if the remote unit 12 is called by the base unit 10 in S216. Then, at the next control frame (second control frame), the remote unit 12 calls the remote unit 11 if needed in S220. At the next control frame (third control frame), the remote unit 12 starts communication with another remote unit 11 or 13 when the remote unit 12 is called by the remote unit in S226. The remote unit 12 calls the base unit 10 if needed in S228. The remote unit 12 further transmits a synchronization verification signal to the base unit 10 in S230. Then, at the next control frame (fourth control frame), the remote unit 12 calls the remote unit 13 if needed in S234.

On the other hand, for the remote unit 11, the order in performing the processes S212–S216, the processes S217–S222, the processes S223–S230, and the processes S231–S236 is changed. That is, the processes S212–S216, the processes S223–S230, the processes S217–S222, and the processes S231–S236 are performed in this order in the successive four (first through fourth) control frames. The processes S217–S222 are modified to call the remote unit 12 if needed. More specifically, when receiving an initial synchronization signal at a certain control frame (first control frame) in S215, the remote unit 11 also starts communication with the base unit 10 in the same control frame if the remote unit 11 is called by the base unit 10 in S216. At the next control frame (second control frame), the remote unit 11 starts communication with another remote unit 12 or 13 when the remote unit 11 is called by the remote unit in S226. The remote unit 11 calls the base unit 10 if needed in S228. The remote unit 11 further transmits a synchronization verification signal to the base unit 10 in S230. Then, at the next control frame (third control frame), the remote unit 11 calls the remote unit 12 if needed In S220. Then, at the next control frame (fourth control frame), the remote unit 11 calls the remote unit 13 if needed in S234.

For the remote unit 13, the order in performing the processes S212–S216, the processes S217–S222, the processes S223–S230, and the processes S231–S236 is further changed. That is, the processes S212–S216, the processes S217–S222, the processes S231–S236, and the processes S223–S230 are performed in this order in the successive four (first through fourth) control frames. The processes S231–S236 are modified to call the remote unit 12 if needed. More specifically, when receiving an initial synchronization signal at a certain control frame (first control frame) in S215, the remote unit 13 also starts communication with the base unit 10 in the same control frame if the remote unit 13 is called by the base unit 10 in S216. At the next control frame (second control frame), the remote unit 13 calls the remote unit 11 if needed in S220. Then, at the next control frame (third control frame), the remote unit 13 calls the remote unit 12 if needed in S234. Then, at the next control frame (fourth control frame), the remote unit 13 starts communication with another remote unit 11 or 12 when the remote unit 13 is called by the remote unit in S226. The remote unit 13 calls the base unit 10 if needed in S228. The remote unit 13 further transmits a synchronization verification signal to the base unit 10 in S230.

Next, the states of the communication units 10–13 when executing the above-described processes will be described with reference to the charts in FIGS. 15(a)–15(d).

In the charts, an unfilled square symbol indicates that a corresponding communication unit is performing transmission in a control frame. A square outline with a filled center indicates that a corresponding communication unit is performing transmission in a communication frame. All communication units without a symbol are performing reception operations.

First, the states of the base unit 10 and the remote units 11–13 during the wait state will be described with reference to FIG. 15(*a*).

First, the counter values M and N of the hopping counter 34 are set to 0. and a control frame A0 begins. The base unit 10 transmits control signals, including an initial synchronization signal, to the remote units 11–13 at a frequency fB (=fg0, in this frame). The remote units 11–13 synchronize themselves with the base unit 10 based on this synchronization signal.

This frequency fB is changing or hopping according to the hop frequency data array B. As described above, the data array B is created based on the hop numbers N and M that have not been modified by the hopping controller 35. These frequencies are therefore represented simply by fB in the charts, but change with each frame and according to the cycle of fg0, fd1–fd5, . . . , fgMmax, and fd(Nmax–3)–fdNmax and fd0 based on the counter values M and N.

After the control frame A0, communication frames A1–A5 (F1) are performed. Then, the next control frame A6 begins. In this frame, the remote unit 11 transmits control signals, including a synchronization verification signal, to the base unit 10 at the frequency fB (=fg1).

As the counter value M is incremented one by one, the control frames A12, A18, A24, . . . , will be performed in this order. In the control frame A12, the remote unit 12 will transmit control signals including a synchronization verification signal to the base unit 10 at the frequency fB (=fg2). In the control frame A18, the remote unit 13 will transmit control signals including a synchronization verification signal to the base unit 10 at the frequency fB (=fg3). In the next control frame A24 (not shown), the base unit 10 will again transmit initial synchronization signals at the frequency fB (=fg4) to the remote units 11–13. The process is thus repeated.

It is noted that communication units currently in a wait state and not engaged in communication enter a sleep state during the communication frames A1–A5, A7–A11, . . . in order to conserve power. Further, rather than continuously repeating the above-described process to maintain synchronization, the remote units 11–13 can perform this synchronization process at intervals, sleeping for a specified length of time between processes.

Next will be described, with reference to FIG. 15(*b*), the states of the communication units 10–13 when the base unit 10 calls the remote unit 12.

During the first control frame B0, the base unit 10 transmits control signals, including an initial synchronization signal and also a call signal, to the remote units 11–13 at the frequency fB (=fg0). The call signal includes the ID number indicative of the remote unit 12. In the latter half of the same control frame, the remote unit 12 immediately transmits control signals, containing a synchronization verification signal and a connection acknowledge signal, to the base unit 10 at the frequency fB (=fg0). Communication between the base unit 10 and the remote unit 12 begins promptly in the next communication frame B1. That is, in the first phase of the frame B1, the base unit 10 transmits communication signals to the remote unit 12 at the frequency fB (=fd1). In the second phase of the same frame, the remote unit 12 transmits communication signals to the base unit 10 at the frequency fB (=fd1). Communication frames are continuously generated for the specified number of frames jdmax. In this example, the number jdmax of the continuous communication frames is five (5). Therefore, the base unit 10 and the remote unit 12 continue to transmit and receive communication signals through frames B1 and B5 with using frequencies fd1–fd5. Throughout these communication frames, the remote units 11 and 13 both remain in a wait state.

Next, the counter value M is incremented to one, and the control frame B6 begins. In this frame, the remote unit 11 transmits control signals, containing a synchronization verification signal, to the base unit 10 at the frequency fB (=fg1). As each control frame is generated, the remote units 11–13 alternate in this order in transmitting control signals, containing synchronization verification signals, to the base unit 10 at the frequency fB (fg1, fg2, fg3, . . . ). During these control frames B0, B6, B12, B18, . . . , communication between the base unit 10 and the remote unit 12 is temporarily suspended. However, the suspension is extremely short and has no effect on the communication. When voice data, in particular, is being communicated, there are no noticeable breaks in the users' conversation.

It is now assumed that five successive communication frames B19–B23 (not shown) are attained after the control frame B18, and that a control frame C0 shown in FIG. 15(*c*) is performed afterwardly.

In the control frame C0 of FIG. 15(*c*), the base unit 10 transmits control signals, containing an initial synchronization signal and a busy signal, to the remote units 11–13 at the frequency fB (=fg0). Communication between the base unit 10 and the remote unit 12 continues throughout the communication frames C1–C5. It is noted that the remote units 11 and 13 have also received in the frame B0 the call signal calling the remote unit 12 transmitted from the base unit 10. The remote units 11 and 13 have also received in the frame C0 the busy signal transmitted from the base unit 10. Accordingly, if the users of the remote units 11 and 13 attempt to call the base unit 10 or the remote unit 12, he/she can be notified that the base unit 10 and the remote unit 12 are in use.

Next will be described with reference to FIG. 15(*c*) the states of the communication units 10–13 when the remote unit 13 calls the remote unit 11. It is noted that this example will assume that the base unit 10 and the remote unit 12 continue to be engaged in communication. However, the process of the remote units 11 and 13 would be the same if the base unit 10 and the remote unit 12 were in a wait state.

In the control frame C0, the base unit 10 transmits control signals, including an initial synchronization signal and a busy signal, to the remote units 11–13 at the frequency fB (=fg0). The base unit 10 and the remote unit 12 continue to communicate with each other during the subsequent communication frames C1–C5. In the first phase of the next control frame C6, the remote unit 13 transmits a call signal to the remote unit 11 at the frequency fB (=fg1). In the second phase of the same frame, the remote unit 11 transmits a connection acknowledge signal to the remote unit 13 at the frequency fB (=fg1). Thus, in a control frame that a called remote unit (receiver) is to transmit control signals, the calling remote unit (caller) transmits a call signal during the reception phase of the called remote unit, and the called remote unit immediately responds by transmitting a connection acknowledge signal for the calling remote unit. It is noted that since the frequencies used in control frames are common to both the data arrays fB and fH1, the frequency used by the calling and called remote units 13 and 11 is represented in FIG. 15(*c*) by fH1 for convenience because those units 11 and 13 will use the data array fH1 in the following communication frames.

In the next communication frame C7, a communication hop number N is created in both the remote units 11 and 13 by adding the specified value S to the original counter value N. Since the specified value S is 2 in this example, this addition effectively shifts the hop frequency data array H1, to be used by these remote units 11 and 13, two phases from the hop frequency data array B. The remote units 11 and 13 therefore change from using the data array fB to using the data array H1.

In the communication frame C7, communication resumes between the base unit 10 and the remote unit 12. In the first phase of the frame, the bass unit 10 transmits communication signals to the remote unit 12 at the frequency fB (=fd6). In the second phase of the same frame, the remote unit 12 transmits communication signals to the base unit 10 at the frequency fB (=fd6).

Simultaneously, communication begins between the remote units 11 and 13. In the first phase of the communication frame C7, the remote unit 13 transmits communication signals to the remote unit 11 at the frequency fH1 (=fd8). In the second phase of the same frame, the remote unit 11 transmits communication signals to the remote unit 13 at the frequency fH1 (=fd8).

Although the frequency fH1 is simply represented by fH1 in FIG. 15(*c*), the frequency is actually changing in an ordered cycle of the form fg0, fd3, fd4, fd5, fd6, fd7, fg1, fd8, . . . , fgMmax, . . . , fdNmax, fd0, fd1, and fd2. The frequency fH1 changes each communication frame based on the communication hop number N, which has been modified by the hopping controller 35 as described above. The remote units 11 and 13 can still receive control signals from the base unit 10, because they use the same frequencies fg0–fgMmax with the base unit 10 during the control frames. During the communication frames, however the remote units 11 and 13 use frequencies that are shifted exactly two phases from the frequencies used by the base unit 10 and the remote unit 12. Accordingly, the two pairs of communication units (10–12) and (11–13) can perform communication without interfering with each other.

In this way, control signals are transmitted and received between the base unit 10 and all the remote units 11–13 during the control frames, and communication signals are transmitted and received between linked communication units during the communication frames. This pattern is repeated until calls between the linked communication units are completed.

As described above, the base unit 10 transmits control signals containing the initial synchronization signal to all of the remote units 11–13 during the control frames. This process allows the remote unit 11 and the remote unit 13, when linked together in communication, to maintain synchronization with the base unit 10 and with each other.

Next will be described below, with reference to FIG. 15(*d*), the states of the communication units 10–13 when the remote unit 12 calls the base unit 10.

In the first control frame D0, the base unit 10 transmits control signals, including an initial synchronization signal, to the remote units 11–13 at the frequency fB (=fg0). In the next control frame D6, the remote unit 11 transmits control signals, containing a synchronization verification signal, to the base unit 10 at the frequency fB (=fg1).

In the next control frame D12, the remote unit 12 transmits control signals, containing a synchronization verification signal and a call signal, to the base unit 10 at the frequency fB (=fg2). In the first phase of the next communication frame D13, the base unit 10 transmits a connection acknowledge signal to the remote unit 12 at the frequency fB (=fd11). In the second phase of the same frame, the remote unit 12 transmits a verification signal to the base unit 10 at the frequency fB (=fd11).

In the first phase of the next communication frame D14, the base unit 10 transmits communication signals to the remote unit 12 at the frequency fB (=fd12). In the second phase of the same frame, the remote unit 12 transmits communication signals to the base unit 10 at the frequency fB (=fd12). This process of transmitting and receiving communication signals between the base unit 10 and the remote unit 12 is repeated in all the subsequent communication frames D15–D17, D19–D23, . . .

In the above-described examples of FIGS. 15(*a*)–15(*d*), synchronization between the base unit 10 and the remote units 11–13 is attained as described below.

As described already, synchronization signals are contained in signals transmitted in all the frames. Accordingly, in the example of FIG. 15(*a*), the initial synchronization signal, transmitted from the base unit 10 to the remote units 11–13 in the control frame A0, includes a synchronization signal. Upon receiving the synchronization signal, the remote units 11–13 synchronize themselves with the base unit 10, and send synchronization verification signals in the control frames A6, A12, and A18, respectively. The remote units 11–13 can also send control signals, if necessary, in those control frames A6, A12, and A18.

The above-described synchronization operation attained between the base unit 10 and all the remote units 11–13 is attained at the control frames A0, A6, . . . , even when at least two of the units are conducting communications with one another.

For example, the synchronization operation is attained between the base unit 10 and all the remote units 11–13 at the control frames A0, A6, . . . , even when communication is attained between the base unit 10 and one remote unit 11, 12, or 13 as in the example of FIG. 15(*b*) or 15(*d*). It is noted that in this case, synchronization between the communicating units is performed also based on synchronization signals contained in signals communicated between the communicating units.

Similarly, the synchronization operation is attained between the base unit 10 and all the remote units 11–13 at the control frames A0, A6, . . . , even when communication is attained between two remote units as in the example of FIG. 15(*c*). It is noted that in this case, synchronization between the communicating units is performed also based on synchronization signals contained in signals communicated between the communicating units. However, synchronization between those communicating remote units and the base unit is attained through the control operations achieved in the control frames A0, A6, . . .

The above-described process of communication between the base unit and one remote unit is applied not only to internal communication between the base unit 10 and one of the remote units 11–13 but also to communication between one of the remote units 11–13 and an external telephone via a telephone circuit. The above-described process of remote-to-remote communication is applied only to internal communication between two of the remote units 11–13.

As described above, the wireless communication system of the present embodiment includes the base unit and the plurality of remote units, in which two remote units can communicate separately from and simultaneously with communication between the base unit and another remote unit. The wireless communication system can maintain synchronization between the base unit and the remote units and process such control signals as call signals without interrupting communication currently in progress. To achieve this, a communication hop frequency data array D is provided for communication use. The communication hop frequency data array D is constructed from a plurality of hop frequency data d0, d1, d2, ..., dN, ..., and dNmax in correspondence with hop numbers N, wherein N equals 0 through Nmax. A control hop frequency data array G is also provided for control use. The control hop frequency data array G is constructed from a plurality of hop frequency data g0, g1, g2, ..., gM, ..., and gMmax in correspondence with other hop numbers M, wherein M equals 0 through Mmax. Both data arrays D and G are stored in the hopping table 36. Data elements in the control hop frequency data array G and in the communication hop frequency data array D are retrieved from the hopping table 36 so that data in the data array G will be distributed regularly throughout the communication hop frequency data array D. In the described example, data elements g0, d1–d5, g1, d6–d10, g2, d11–d15, ..., gMmax, and d(Nmax-3)–dNmax and d0, are consecutively retrieved in this order from the hopping table 36. Receiving those data elements, the frequency synthesizer 40 oscillates 60 that the oscillation frequency consecutively hops in a frequency array fg0', fd1'–fd5', fg1', fd6'–fd10', fg2', fd11'–fd15', ..., fgMmax', and fd(Nmax-3)'–fdNmax' and fd0'. Accordingly, transmission and reception operation will be performed with frequencies fg0, fd1–fd5, fg1, fd6–fd10, fg2, fd11–fd15, ..., fgMmax, and fd(Nmax-3)–fdNmax and fd0.

While the invention has been described in detail with reference to the specific embodiment thereof, it would be apparent to those skilled in the art that various changes and modifications may be made therein without departing from the spirit of the invention.

Below are descriptions of variations applicable to the embodiment described above.

For various reasons, a base unit and remote units may lose synchronization with each other. Accordingly, the hop frequency data generator 21 of each remote unit may be configured to be capable of generating hop frequency data for recovering synchronization. This synchronization recovery hop frequency data is for causing the remote unit to continue receiving at a frequency that the base unit 10 uses for transmitting a synchronization signal. For example, when the base unit transmits a synchronization signal with the frequency fg0, the hop frequency data generator 21 may be designed to continuously generate hop frequency data g0 for recovering synchronization. When the hop frequency data generator 21 generates the hop frequency data for recovering synchronization, the communication unit 22 waits in a condition capable of receiving control signals from the base unit, thereby receiving synchronization signals. Thus, regardless of the counter values M and N of the hopping counter 34, the hop frequency data generator 21 continues to generate the control hop frequency data g0, for example. By continuing to receive signals at the frequency based on the hop frequency data g0, the remote unit will eventually be able to receive a synchronization signal from the base unit 10. After receiving this synchronization signal, the remote unit can achieve synchronization with the base unit 10 and communicate normally thereafter.

More specifically, the hop frequency data generator 21 may be designed to be capable of continuing to generate the control hop frequency data g0 for at least one hop cycle, during which the base unit 10 successively generates all the hop frequency data. For example, the hop frequency data generator 21 may be designed to be capable of continuing to generate the control hop frequency data g0 for three hop cycles at maximum. When the remote unit properly receives the control frame go from the base unit, the remote unit will be properly synchronized with the base unit. The remote unit will therefore immediately start hopping to the subsequent hop data d1, d2, ... When the remote unit fails to receive the control frame go from the base unit during the three hop cycles, on the other hand, the remote unit will be entered to an error processing operation.

It is possible to choose any control hop frequency data to be used as the synchronization recovery hop frequency data. It is also possible to select one of the control hop frequency data randomly. Choosing control hop frequency data randomly can reduce the probability of receiving interference during synchronization recovery.

In the embodiment described above, hop frequency data arrays B, H1, and H2 are used for communication performed between the communication units. However, it is possible to provide a different frequency phase for each of the combinations: base unit 10/remote units 11–13 (control frames), base unit 10/remote unit 11, base unit 10/remote unit 12, base unit 10/remote unit 13, remote unit 11/remote unit 12, remote unit 11/remote unit 13, and remote unit 12/remote unit 13. Accordingly, the hop frequency data array would be shifted the number of phases prescribed for the particular combination.

In the embodiment described above, control hop frequency data is continuously generated for only one frame. However, it is also possible to provide two or more continuous control frames at intervals among the communication frames. With consecutive control frames, if interference occurs when transmitting and receiving call signals, it is no longer necessary for a remote unit to wait until after receiving the next initial synchronization signal and arriving at a prescribed control frame before resendlng the call signal. The remote unit can resend the call signal in the control frame that is generated immediately after the control frame in which the error has occurred. Hence, more complex control processes can be executed by generating a plurality of consecutive control frames.

In the above-described embodiment, when one remote unit calls the base unit in one control frame, the base unit sends a connection acknowledge signal in the next frame. However, the base unit may send the connection acknowledge signal in the same control frame.

As described above, the wireless communication system of the embodiment uses a frequency hopping method. In this system, the base communication unit is provided as capable of being connected to an external communication circuit. The plurality of remote communication units are provided. Each remote communication unit is capable of communicating wirelessly with the base communication unit and with other remote communication units. Each of the base communication unit and the plurality of remote communication units has a hop frequency data generator for generating hop frequency data according to a prescribed sequence. The hop frequency data sequence is comprised of a control hop frequency data array and a communication hop frequency data array. The hop frequency data generator generates the hop frequency data so that data from the control hop frequency data array is distributed at regular intervals throughout the communication hop frequency data array. Each of the base communication unit and the plurality of remote communication units is further provided with the communication unit for creating transmission signals through spreading input signals with using the hop frequency data and for creating output signals through despreading reception signals with using the hop frequency data.

With the wireless communication system of this configuration, the hop frequency data generator in each remote communication device can generate a hop frequency data array for use in remote-to-remote communication. The communication unit in each remote unit uses the hop frequency data array for performing remote-to-remote frequency-hopping communication.

According to the embodiment, the hop frequency data is generated so that the data elements of the control hop frequency data array are distributed at regular intervals throughout the communication hop frequency data array. With this arrangement, both of the remote-to-remote communication and base-to-remote communication can be performed using the communication hop frequency data array, while synchronization between the base unit and the remote units can be maintained and call signals and the like can be controlled using the control hop frequency data array. Being distributed throughout the communication hop frequency data array, the control hop frequency data does not cause any significant interruptions in either base-to-remote communication or remote-to-remote communication.

The amount of data transmitted and received for maintaining synchronization and for processing call signals and the like is less than the amount of communication data transmitted and received during communication. Therefore, the number of times data is transmitted and received using the control hop frequency data can be made less than that using communication hop frequency data. Accordingly, the control hop frequency data array can contain fewer data than the communication hop frequency data array in order to perform a more effective overall communication. It is possible to maintain sufficient control and increase the amount of communication data to be transmitted and received.

According to the embodiment, the communication hop frequency data is generated at least two times consecutively. In other words, communication is performed continuously during at least two successive communication frames, wherein each frame is a unit of communication time. Accordingly, a large amount of data can be transferred effectively using the communication hop frequency data.

In order to maintain synchronization between the base unit and the remote units, the base unit transmits a control signal (initial synchronization signal in the embodiment) during the first control frame (A0, B0, C0, or D0 in the embodiment) with using the control hop frequency data. These control signals (initial synchronization signal) contain a synchronization signal for maintaining synchronization between the bass unit and the remote units. Each of the remote units receives the synchronization signal, synchronizes itself with the base unit with using the synchronization signal, and, when synchronization is executed successfully transmits prescribed control signals, such as call signals, if necessary, to the base unit in a control frame (A6, A12, A18, B6, B12, B18, C6, C12, C18, D6, D12, or D18 in the embodiment) which is different from the first control frame (A0, B0, C0, or D0). Accordingly, even the plurality of remote units can easily maintain synchronization with the base unit without interfering with communication that is being currently performed with using the communication hop frequency data array.

According to the embodiment, a calling communication unit transmits, during a control frame, control signals containing a call signal to request a connection with a receiving communication unit. When the calling unit (caller) is the base unit, the receiving unit (receiver) is one of the plurality of remote units. When the calling unit is one remote unit, the receiving unit is either the base unit or another remote unit. When connection with the calling communication unit is possible, the receiving communication unit transmits, during the same control frame, control signals containing a connection acknowledge signal. Hence, both a call and an answer can be transmitted during the same control frame, and communication between the caller and the receiver can begin immediately in the next frame with using the communication hop frequency data. It is possible to shorten the period of time required before communication is started after the calling unit calls the receiver.

In order to achieve direct remote-to-remote communication, the hop frequency data generator in each remote unit is designed as capable of generating a remote-to-remote communication hop frequency data array, which data array is shifted in phase from the base-to-remote communication hop frequency data array to be generated for base-to-remote communication. Any two remote units can perform direct communication with each other with using the remote-to-remote communication hop frequency data. That is, transmission signals are generated through spreading the input signals with the remote-to-remote communication hop frequency data, and output signals are generated through despreading the reception signals with the remote-to-remote communication hop frequency data.

Thus, hop frequency data arrays for use in remote-to-remote communication are shifted a prescribed number of phases from the hop frequency data used for base-to-remote communication. It is now assumed that the communication hop frequency data array for base-to-remote communication is set so that the hop frequency data will change repeatedly in a pattern such as D1, D2, D3, D4, D5, D1, D2, D3, . . . , wherein each of the data elements D1–D5 is hop frequency data. Shifting this communication hop frequency data array two phases results in a communication hop frequency data array having the repetitive pattern D3, D4, D5, D1, D2, D3, D4, D5, D1, D2, . . . , which data array generates hop frequency data in the same sequence as the original data array but never generates the same hop frequency data as the original data simultaneously. The thus obtained data array will be used in remote-to-remote communication.

In this case, the frequencies shifted for use in the remote-to-remote communication are set not to overlap the frequencies used in the base-to-remote communication. In the previous example, D1 through D5 are set to satisfy the condition that D1≠D3≠D5 and D2≠D4. Thus, direct remote-to-remote communication can be performed without affecting the frequency used in the base-to-remote communication. Accordingly, when three or more remote units are provided to the entire system, the first and second remote units, for example, can communicate with each other even While the third is communicating with the base unit. Hence, the plurality of remote units can be operated efficiently.

With the above-described arrangement, the wireless communication system of the present embodiment need not be prepared with completely different hop frequency data arrays to match the number of possible channels being used simultaneously. Instead, it is sufficient to prepare and store only one communication hop frequency data array. By shifting the phase of this one data array, it is possible to create channels for remote-to-remote communication as different from the channel for the base-to-remote communication. As a result, the hop frequency data generator in each of the base and the remote units can be made compact. Moreover, this method eliminates such troubles as two channels accidentally changing or hopping to the same frequency at the same time. Further, since the amount of the control hop frequency data array is much smaller than that of the communication hop frequency data array, the hop frequency data generator can be made even more compact.

One example of the wireless communication system of the present embodiment is a cordless telephone system comprised of a stationary telephone (base set) and movable telephones (handsets). However, the base unit and the remote units could also be applied to devices of various types, such as computers, their peripherals, and facsimile machines, for transmitting and receiving voice, image, and other types of data.

For example, the base unit is constructed from a facsimile device which is capable of connecting to an external communication circuit such as a public telephone line. Each of the plurality of remote units is constructed from a cordless transceiver (transmitter/receiver). With this arrangement, internal calls can be performed between the base unit and each remote unit. Internal calls can be performed also between any two remote units. The remote units can also call to an external telephone via the base unit.

When the base unit is constructed from a stationary telephone in a cordless phone system, it is possible to use a facsimile device as one of the plurality of remote units. The base unit can be constructed from a host computer (terminal unit) capable of connecting to a wired LAN, which serves as the external communication circuit. In this case, the remote units can be constructed from a plurality of portable computers. In this case, data can be communicated between the portable computers and the host computer via the base-to-remote communication. Data can also be communicated between any two portable computers via the remote-to-remote communication.

During the base-to-remote and remote-to-remote communication, the transmission/reception frequency successively changes according to the hop frequency data array. It is therefore imperative that the remote units maintain precise synchronization with the base unit. To achieve this, each of the remote units continually adjusts synchronization with the base unit based on synchronization signals that are included in control signals transmitted from the base unit. If synchronization adjustments are made before the remote unit completely loses synchronization with the base unit, synchronization can be maintained. However, in order to ensure more reliable synchronization, according to the present embodiment, control signals are regularly transmitted and received between the base unit and the remote units during the control frames even when some two remote communication units perform remote-to-remote communication. Thus, the remote units are synchronized with the base unit. By doing this, discrepancies in synchronization can be corrected regularly, regardless of whether remote-to-remote communication is being performed. Data for an incoming call from the external communication circuit, for example, is always first recognized by the base unit and is then passed on to a remote unit via base-to-remote communication. The present system is convenient in that the data can be passed on during synchronization adjustments, even to a remote unit that is being engaged in remote-to-remote communication.

If the battery in a remote unit becomes ineffective and is subsequently replaced with another battery, or if the remote unit is outside of a communication range in relation to the base unit and is subsequently brought back within that range, that remote unit cannot immediately recover synchronization with the base unit. In view of this, the hop frequency data generator in each remote unit can be designed as capable of generating hop frequency data for recovering synchronization. When the hop frequency data generator in the remote unit generates hop frequency data for recovering synchronization, the communication unit waits in a condition capable of receiving control signals from the base unit, thereby receiving synchronization signals.

With this structure, if circumstances cause the remote unit to lose synchronization with the base unit, the remote unit waits in a state capable of receiving control signals from the bass unit, using hop frequency data generated for recovering synchronization. The remote unit can therefore recover synchronization when the base unit transmits control signals containing synchronization signals at a frequency corresponding to the generated hop frequency data for recovery. After the remote unit achieves synchronization, the hop frequency data generator resumes generation of communication hop frequency data and control hop frequency data in synchronization with the base unit, and the remote unit can once again perform communication.

The hop frequency data generator in each remote unit can be constructed as capable of generating a plurality of different hop frequency data arrays for remote-to-remote communication, which data arrays are shifted in phase from one another. In order for one remote unit to communicate with another remote unit, the communication unit in the subject remote unit selects one data array of the plurality of hop frequency data arrays, the selected data array being different from data array(s) currently being used between other remote-to-remote communication. In doing so, the remote unit creates a communication channel different from any other channels(s) being used by other communication units, thereby allowing a plurality of pairs of communication units to perform communication simultaneously without interrupting one another. If four or more remote units are used in the entire system, for example, then two or more pairs of remote units can simultaneously perform remote-to-remote communication without interfering with one another.

As described above, the hop frequency data generator is constructed as capable of generating, in addition to a communication hop frequency data array for base-to-remote communication, communication hop frequency data arrays for remote-to-remote communication and a control hop frequency data array. The hop frequency data arrays for remote-to-remote communication are generated by shifting the base-to-remote communication hop frequency data array by prescribed amounts.

According to the embodiment, the hop frequency data generator is constructed from: a data storing table for storing a communication hop frequency data array and a control hop frequency data array; an index counter for maintaining an index number that is continuously updated synchronous to updates performed in the opposing communication device; and an index modifying controller capable of performing a prescribed modification on the index number maintained by the index maintaining counter to thereby convert the index number to a modified index number.

In order to generate the remote-to-remote communication hop frequency data, the hop frequency data generator uses the modified index number as a parameter for indexing data stored in the data storing table, thereby generating a remote-to-remote communication hop frequency data array whose communication hop frequency data is shifted according to the modified index number from the base-to-remote communication hop frequency data.

The data storing table is configured with a ROM, a RAM, or another storage medium capable of storing the communication hop frequency data array and the control hop frequency data array. Each data element, constituting each of the communication hop frequency data array and the control hop frequency data array is made from a value having a one-to-one correspondence with a frequency that is to be generated at the frequency synthesizer. The index number, maintained at the index maintaining counter, is for indicating the position in the communication hop frequency data array and the control hop frequency data array, from which to read.

As this index number is consecutively updated, the value read from the data storing table changes. Accordingly, the frequency generated from the frequency synthesizer will change based on the hop frequency data that is read from the table.

The index modifying controller can modify the index number to a modified index number. Since remote-to-remote communication hop frequency data is read based on this modified index number, the frequency that is to be generated by the frequency synthesizer will be different from the frequency generated based on the original index number. For example, if the original index numbers are 1, 2, 3, . . . , and the index modifying controller adds a value of 2 to each index number, then the modified index numbers will be 3, 4, 5, . . . The hop frequency data read based on these modified index numbers will be two places forward in the data array from hop frequency data read based on the original index numbers.

Hence, it is possible to easily generate remote-to-remote communication hop frequency data. It is possible to generate a plurality of different hop frequency data arrays simply by modifying the index number indexing the position on the array to read. As a result, it is sufficient to store only one data array in the data storing table. The storing capacity necessary for storing data arrays can be made much smaller than when actually storing a plurality of different hop frequency data arrays in the data storing table.

The index modifying controller does not modify the index number maintained at the index maintaining counter when desiring to generate a hop frequency data array either for base-to-remote communication or for control. The index modifying controller modifies the index number through calculation of the index number maintained at the index maintaining counter with a prescribed value when desiring to generate any other types of hop frequency data arrays. Hence, it is not necessary to modify the index number when desiring to generate control hop frequency data and communication hop frequency data for base-to-remote communication, which communication being usually the most frequently performed communication. It Is possible to effectively simplify the overall operations.

With the wireless communication system as described above, it is possible to generate a plurality of different hop frequency data arrays simply by modifying the index number indexing the position in the array to read. As a result, only one data array needs to be stored in the data storing table, and the storing capacity necessary for storing data arrays can be made much smaller than when actually storing a plurality of hop frequency data arrays in the data storing table.

What is claimed is:

1. A wireless communication system, comprising:
a base communication unit capable of being connected to an external communication circuit and of being wirelessly communicated with a plurality of remote communication units, the base communication unit including:
an input device that inputs input signals to be transmitted to at least one of the remote communication units;
a reception device that receives reception signals transmitted from at least one of the remote communication units;
a hop frequency data generator that generates an array of hop frequency data according to a predetermined sequence, the hop frequency data array being formed from a control hop frequency data array and a communication hop frequency data array in a manner that data constituting the control hop frequency data array is distributed throughout the communication hop frequency data array; and
a communication device that creates transmission signals through spreading the input signals with the hop frequency data and for creating output signals through despreading the reception signals with the hop frequency data; and
the plurality of remote communication units, each remote communication unit being capable of communicating wirelessly with the base communication unit and with other remote communication units, each remote communication unit including:
an input device that inputs input signals to be transmitted to one of the base unit and the other remote communication units;
a reception device that receives reception signals transmitted from one of the base unit and the other remote communication units;
a hop frequency data generator that generates an array of hop frequency data according to a predetermined sequence, the hop frequency data array being formed from a control hop frequency data array and a communication hop frequency data array in a manner that data constituting the control hop frequency data array is distributed throughout the communication hop frequency data array; and
a communication device that creates transmission signals through spreading the input signals with the hop frequency data and for creating output signals through despreading the reception signals with the hop frequency data.

2. The method according to claim 1, wherein the control hop frequency data array generated by the hop frequency data generator is shared by all of the base communication units and all of the remote communication units to create a single control hop frequency pattern.

3. The method according to claim 2, wherein the communication hop frequency data array generated by the hop frequency data generator is shared by currently communicating communication units only, to create a same communication hop frequency pattern.

4. The system according to claim 3, wherein the communication hop frequency data array is used to create different communication hop frequency patterns for base-to-remote communication and for remote-to-remote communication.

5. A wireless communication system as claimed in claim 1, wherein the amount of data constituting the control hop frequency data array is smaller than the amount of data constituting the communication hop frequency data array.

6. A wireless communication system as claimed in claim 4, wherein the hop frequency data generator generates the communication hop frequency data array so that data constituting the communication hop frequency data array is generated at least two times consecutively.

7. A wireless communication system as claimed in claim 4, wherein the base communication unit further includes a control signal generator that generates a synchronization signal for maintaining synchronization between the base communication unit and the plurality of remote communication units, the control signal generator generating the synchronization signal during a first control frame when the hop frequency data generator generates data in the control hop frequency data array, and wherein each remote communication unit includes control signal generator that generates a control signal during another control frame which is different from the first control frame, the hop frequency data generator generating data In the control hop frequency data array during the other control frame.

8. A wireless communication system as claimed in claim 7, wherein the control signal generator in the base communication unit generates, during a desired control frame, a call signal to request a connection with one remote communication unit, the control signal generator in the called remote communication unit generating, during the same control frame, a connection acknowledge signal to inform the base communication unit that connection with the base communication unit is possible, wherein the control signal generator in each remote communication unit generates, during a desired control frame, a call signal to request a connection with one of the base communication unit and the other remote communication units, the control signal generator in the called communication unit generating, during the same control frame, a connection acknowledge signal to inform the calling communication unit that connection with the calling communication unit is possible.

9. A wireless communication system as claimed in claim 4, wherein each remote communication unit further includes a phase shifting device for shifting in phase the communication hop frequency data array generated by the hop frequency data generator to create another communication hop frequency data array to be used for communication between another remote communication unit, the communication device in each remote communication unit generating transmission signals to be transmitted to the other remote communication unit through spreading the input signals with using the other communication hop frequency data array and the control hop frequency data array and generating output signals through despreading the reception signals transmitted from the other remote communication unit with using the other communication hop frequency data array and the control hop frequency data array, thereby performing direct communication with the other remote communication unit.

10. A wireless communication system as claimed in claim 7, wherein the control signal generator in the base communication unit generates a synchronization signal to synchronize the plurality of remote communication units with the base communication unit during a control frame regardless of whether the control frame is provided between communication frames where communication is performed between two remote communication units.

11. A wireless communication system as claimed in claim 4, wherein the hop frequency data generator in each remote communication unit includes a recovery data generator that generates control hop frequency data for use in recovering synchronization with the base communication unit, the communication device in the remote communication unit waiting in a condition capable of receiving a synchronization signal from the base communication unit when the recovery data generator in the remote communication unit generates the hop frequency data for use in recovering synchronization.

12. A wireless communication system as claimed in claim 4, wherein the hop frequency data generator in each remote communication unit is capable of generating a plurality of hop frequency data arrays to be used for communication with other at least two remote communication units, the plurality of hop frequency data arrays being shifted in phase from one another, the communication device in each remote communication unit using one of the a plurality of hop frequency data arrays to communicate with another communication unit.

13. A wireless communication system as claimed in claim 4, wherein the hop frequency data generator in each of the base communication unit and the plurality of remote communication units includes:

a data storage device that stores the hop frequency data array comprised of the communication hop frequency data array and the control hop frequency data array;

an index maintaining device that maintains an index number that is continuously updated synchronously with the synchronization signal;

an index modifying device capable of modifying the index number into a modified index number; and a data generator that continuously retrieves data from, the communication hop frequency data array and the control hop frequency data array as indicated by the index number outputted from the index modifying device, and thereby outputting the communication hop frequency data array and the control hop frequency data array, data in the communication hop frequency data array being shifted in phase when the index modifying device modifies the index number.

14. A wireless communication system as claimed in claim 13, wherein the index modifying device fails to modify the index number maintained by the index maintaining device when generating the control hop frequency data array and a communication hop frequency data array to be used for communication between the base communication unit and the plurality of remote communication units, and modifies the index number through a calculation with a predetermined value when generating any other types of hop frequency data array.

15. A wireless communication system using a frequency hopping method, the system comprising:

a base communication unit capable of being connected to an external communication circuit; and a plurality of remote communication units, each being capable of communicating wirelessly with the base communication unit and with other remote communication units, each of the base communication unit and the plurality of remote communication units including:

a hop frequency data generator that generates hop frequency data according to a prescribed sequence, the generated hop frequency data sequence including a control hop frequency data array and a communication hop frequency data array, data from the control hop frequency data array being distributed throughout the communication hop frequency data array; and a communication device that creates transmission signals through spreading input signals with using the hop frequency data and for creating output signals through despreading reception signals with using the hop frequency data provided by the hop frequency data generating means.

16. The method according to claim 15, wherein the control hop frequency data array generated by the hop frequency data generator is shared by all of the base communication units and all of the remote communication units to create a single control hop frequency pattern.

17. The wireless communication system according to claim 16, wherein the communication hop frequency data array generated by the hop frequency data generator is shared by currently communicating communication units only, to create a same communication hop frequency pattern.

18. The system according to claim 17, wherein the communication hop frequency data array is used to create different communication hop frequency patterns for base-to-remote communication and for remote-to-remote communication.

19. A wireless communication system as claimed in claim 18, wherein the control hop frequency data array contains fewer data than the communication hop frequency data array.

20. A wireless communication system as claimed in claim 18, wherein the communication hop frequency data is generated at least two times consecutively.

21. A wireless communication system as claimed in claim 18, wherein the base communication unit generates, during a first frame used with data from the control hop frequency data array, control signals containing a synchronization signal for maintaining synchronization between the base communication unit and the remote communication units, the remote communication units receiving the synchronization signal, synchronizing themselves with the base communication unit with using the synchronization signal, and, transmitting prescribed control signals in a control frame different from the first control frame when the synchronization process has been executed successfully.

22. A wireless communication system as claimed in claim 18, wherein a calling communication unit, which is either the base communication unit or one of the remote communication units, transmits, during a control frame, control signals containing a call signal to request a connection with a receiving communication unit, which is either the base communication unit or one of the remote communication units, the receiving communication unit transmitting, during the same control frame, control signals containing a connection acknowledge signal when connection with the calling communication unit is possible.

23. A wireless communication system as claimed in claim 18, wherein the hop frequency data generator in each of the remote communication units is capable of generating a hop frequency data array for communication between two remote communication units, which data array is shifted in phase from the hop frequency data array generated for communication between the base communication unit and a remote communication unit, the communication device in each of the remote communication units performing direct communication with another remote communication unit, using the hop frequency data for communication between two remote communication units to generate transmission signals through spreading the input signals and to generate output signals through despreading the reception signals.

24. A wireless communication system as claimed in claim 18, wherein control signals are transmitted and received between the base communication unit and the remote communication units during control frames in order to synchronize the remote communication units with the base communication unit even when communication is being performed between two remote communication units.

25. A wireless communication system as claimed in claim 18, wherein the hop frequency data generator in each remote communication unit is capable of generating hop frequency data for use in recovering synchronization, the communication device in the remote communication unit waiting in a condition capable of receiving control signals from the base communication unit when the hop frequency data generator in the remote communication unit generates frequency data for use in recovering synchronization.

26. A wireless communication system as claimed in claim 18, wherein the hop frequency data generator in each remote communication unit is capable of generating a plurality of hop frequency data arrays to be used during communication held between a plurality of possible pairs of remote communication units, which data arrays are shifted in phase from one another, the communication device in each remote communication unit using one of the plurality of hop frequency data arrays to perform transmission and reception with another remote communication unit, creating a communication channel different from any other channels used by other pairs of communication units, thereby allowing the plurality of possible pairs of communication units to perform communication simultaneously without interrupting one another.

27. A wireless communication system as claimed in claim 18, wherein the hop frequency data generator includes:

a data storage that stores a communication hop frequency data array and a control hop frequency data array;

an index maintaining device that maintains an index number that is continuously updated synchronous to updates performed in an opposing communication unit; and an index modifier capable of modifying the index number maintained by the index maintaining device, thereby converting the index number to a modified index number, the hop frequency data generator being capable of using the modified index number as a parameter for indexing data stored by the data storage and generating a communication hop frequency data array whose communication hop frequency data is shifted according to the modified index number.

28. A wireless communication system as claimed in claim 27, wherein the index modifier fails to modify the index number maintained by the index maintaining device when desiring to generate a hop frequency data array either for control or for communication between the base communication unit and a remote communication unit, and modifies the index number through calculation of the index number with a prescribed value when desiring to generate any other type of hop frequency data array.

* * * * *